United States Patent
Abraha et al.

(10) Patent No.: US 10,164,675 B2
(45) Date of Patent: Dec. 25, 2018

(54) WIDEBAND DIGITAL DISTRIBUTED COMMUNICATIONS SYSTEM(S) (DCS) EMPLOYING PROGRAMMABLE DIGITAL SIGNAL PROCESSING CIRCUIT FOR SCALING SUPPORTED COMMUNICATIONS SERVICES

(71) Applicant: Corning Incorporated, Corning, NY (US)

(72) Inventors: Solomon Tesfay Abraha, Corning, NY (US); Chun-Hung Ho, Taiwan (CN); Anthony Ng'Oma, Horseheads, NY (US)

(73) Assignee: Corning Incorporated, Corning, NY (US)

(*) Notice: Subject to any disclaimer, the term of this patent is extended or adjusted under 35 U.S.C. 154(b) by 29 days.

(21) Appl. No.: 15/167,356

(22) Filed: May 27, 2016

(65) Prior Publication Data
US 2017/0347305 A1 Nov. 30, 2017

(51) Int. Cl.
*H04W 4/00* (2009.01)
*H04B 1/16* (2006.01)
(Continued)

(52) U.S. Cl.
CPC .............. *H04B 1/16* (2013.01); *H04B 1/005* (2013.01); *H04B 1/02* (2013.01)

(58) Field of Classification Search
None
See application file for complete search history.

(56) References Cited

U.S. PATENT DOCUMENTS 7,346,134 B2 * 3/2008 Smith .................... H04B 1/123
375/346
7,583,735 B2 9/2009 Bauman et al.
(Continued)

FOREIGN PATENT DOCUMENTS

WO 2017160595 A1 9/2017

OTHER PUBLICATIONS

Yizhuo Yang; Lim, C.; Nirmalathas, A., "Bit resolution enhanced digitized RF-over-fiber link," in Microwave Photonics (MWP), 2010 IEEE Topical Meeting on, vol., No., pp. 177-180, Oct. 5-9, 2010.

*Primary Examiner* — Anh Vu H Ly
(74) *Attorney, Agent, or Firm* — C. Keith Montgomery

(57) ABSTRACT

Wideband digital distributed communications systems (DCSs) employing reconfigurable digital signal processing circuit for scaling supported communications services are disclosed. The DCS includes a head-end unit that includes front end downlink signal processing circuit to receive and distribute downlink communications signals for communications services (i.e., communications bands) to remote units. The remote units also include front end uplink signal processing circuits to receive uplink communications signals to be distributed to the head-end unit. The front end signal processing circuits are either equipped with broadband filters, or such filters are eliminated, to allow the DCS to be scaled to pass added communications bands. The front end processing circuits include analog-to-digital conversion (ADC) circuits for converting received analog communications signals into digital communications signals so that the digital communications signals can be processed by digital signal processing circuit that can flexibly be configured and reconfigured to support the added communications bands.

40 Claims, 13 Drawing Sheets

(51) Int. Cl.
*H04B 1/02* (2006.01)
*H04B 1/00* (2006.01)

(56) References Cited

U.S. PATENT DOCUMENTS

| | | | | |
|---|---|---|---|---|
| 9,282,560 | B2* | 3/2016 | Negus | H04W 84/12 |
| | | | | 370/328 |
| 9,820,171 | B2 | 11/2017 | Lemson et al. | |
| 2003/0086509 | A1* | 5/2003 | Zogakis | H03G 1/0088 |
| | | | | 375/340 |
| 2004/0107078 | A1* | 6/2004 | Chiu | H03H 17/0294 |
| | | | | 703/2 |
| 2006/0284749 | A1* | 12/2006 | May | H03H 17/0671 |
| | | | | 341/61 |
| 2008/0175175 | A1 | 7/2008 | Oren et al. | |
| 2009/0180407 | A1 | 7/2009 | Sabat et al. | |
| 2009/0180426 | A1 | 7/2009 | Sabat et al. | |
| 2011/0051923 | A1* | 3/2011 | Aravind Batni | H04M 1/58 |
| | | | | 379/391 |
| 2013/0003658 | A1* | 1/2013 | Stewart | H04B 7/022 |
| | | | | 370/328 |
| 2014/0016583 | A1* | 1/2014 | Smith | H04W 12/06 |
| | | | | 370/329 |
| 2014/0286247 | A1 | 9/2014 | Lamson et al. | |
| 2014/0313884 | A1 | 10/2014 | Stapleton et al. | |
| 2016/0094293 | A1* | 3/2016 | Magnezi | H04B 10/25753 |
| | | | | 398/115 |
| 2016/0135184 | A1* | 5/2016 | Zavadsky | H04B 7/04 |
| | | | | 370/329 |
| 2016/0345282 | A1 | 11/2016 | Maca et al. | |
| 2017/0064722 | A1 | 3/2017 | Tarlazzi et al. | |
| 2017/0201322 | A1* | 7/2017 | Harel | H04B 10/25753 |
| | | | | 370/328 |
| 2017/0207853 | A1* | 7/2017 | Harel | H04B 10/25753 |
| | | | | 370/328 |

* cited by examiner

| | INTERFERENCE-LIMITED SYSTEM [ADC BIT RES.=5 BITS] | CONVENTIONAL METHOD [ADC BIT RES.=6 BITS] | PROPOSED METHOD [ADC BIT RES. = 5 BITS + OVERSAMPLING (X6) + DIGITAL FILTERING + DECIMATION (÷6)] |
|---|---|---|---|
| SIGNAL-TO-INTERFERENCE POWER RATIO (SIR, dB) | ~-4.5 | -11 | ~-11 |
| ADC SAMPLING RATE (MHz) | 650 | 650 | 3900 |
| FRONTHAUL PHY BIT-RATE (Gb/s) | 3.25 | 3.9 | 3.25 |

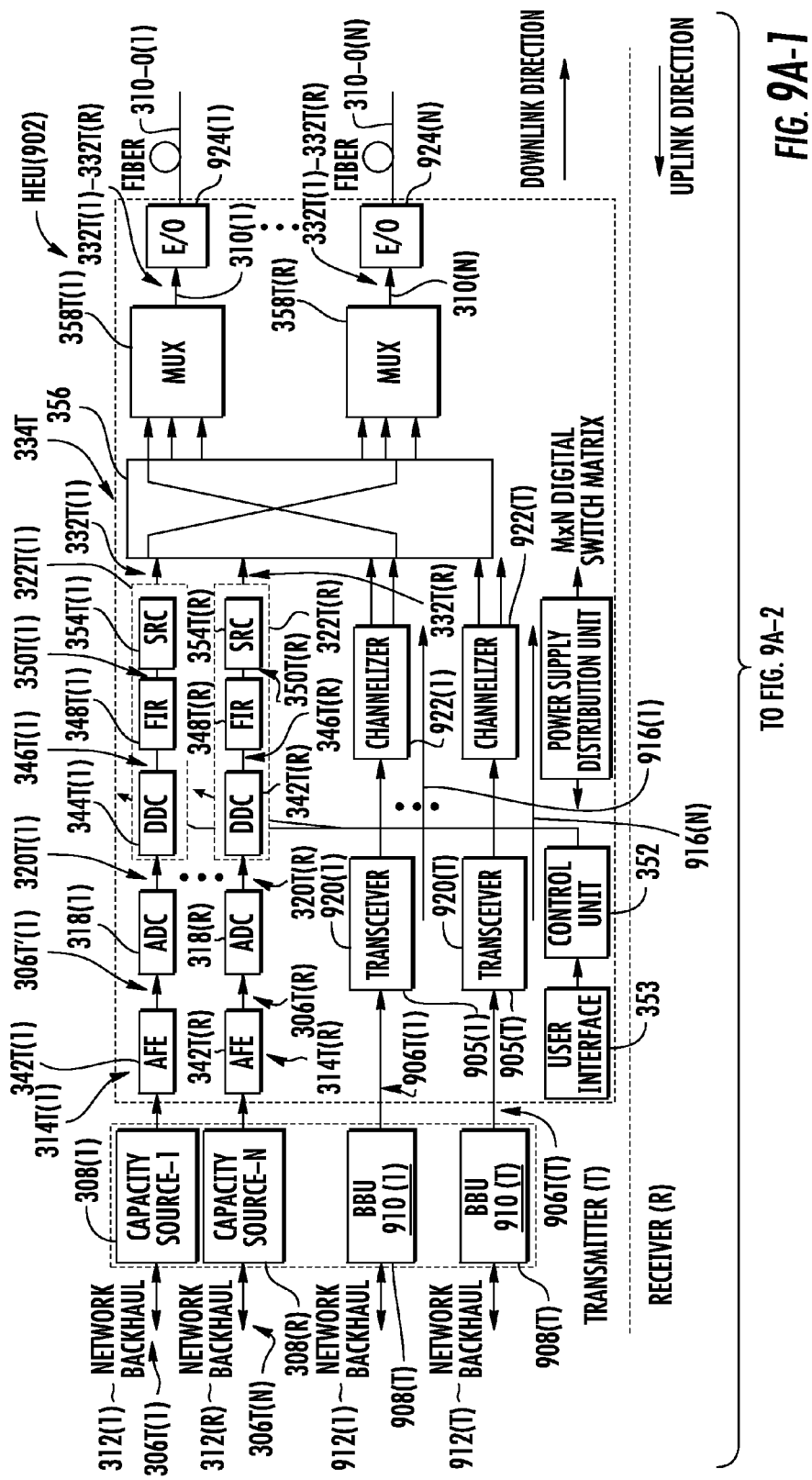

WIDEBAND DIGITAL DISTRIBUTED COMMUNICATIONS SYSTEM(S) (DCS) EMPLOYING PROGRAMMABLE DIGITAL SIGNAL PROCESSING CIRCUIT FOR SCALING SUPPORTED COMMUNICATIONS SERVICES

BACKGROUND

The disclosure relates generally to distributed communications systems (DCS), and more particularly wideband digital DCSs employing programmable digital signal processing for scaling supported communications services.

Wireless customers are increasingly demanding wireless communications services, such as cellular communications services and Wi-Fi services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of distributed antenna systems (DASs). DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIG. 1 illustrates a distributed communications system (DCS) 100 that is configured to distribute communications services to remote coverage areas 102(1)-102(N), where 'N' is the number of remote coverage areas. The DCS 100 in FIG. 1 is provided in the form of a DAS 103. The DAS 103 can be configured to support a variety of communications services that can include cellular communications services, wireless communications services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on RAUs 104(1)-104(N) connected to a centralized equipment 106 (e.g., a head-end controller, a central unit, or a head-end unit). The centralized equipment 106 may be communicatively coupled to a source transceiver 108, such as for example, a base transceiver station (BTS) or a baseband unit (BBU). In this regard, the centralized equipment 106 receives downlink communications signals 110D from the source transceiver 108 to be distributed to the RAUs 104(1)-104(N). The downlink communications signals 110D can include data communications signals and/or communication signaling signals, as examples. The centralized equipment 106 is configured with filtering circuits and/or other signal processing circuits that are configured to support a specific number of communications services (i.e., frequency communications bands). The RAUs 104(1)-104(N) are configured to receive the downlink communications signals 110D from the centralized equipment 106 over a communications link 112 to be distributed to the respective remote coverage areas 102(1)-102(N) of the RAUs 104(1)-104(N). The RAUs 104(1)-104(N) are also configured with filters and other signal processing circuits that are configured to support all or a subset of the specific communications services (i.e., frequency communications bands) supported by the centralized equipment 106. In a non-limiting example, the communications link 112 may be a wired communications link, a wireless communications link, or an optical fiber-based communications link. Each of the RAUs 104(1)-104(N) may include an RF transmitter/receiver (not shown) and a respective antenna 114(1)-114(N) operably connected to the RF transmitter/receiver to wirelessly distribute the communications services to user equipment (UE) 116 within the respective remote coverage areas 102(1)-102(N). The RAUs 104(1)-104(N) are also configured to receive uplink communications signals 110U from the UE 116 in the respective remote coverage areas 102(1)-102(N) to be distributed to the source transceiver 108.

Even though a DCS, such as the DAS 103 in FIG. 1, can address the issue of wireless customers using their wireless communication devices in areas that are poorly serviced by conventional cellular networks, DCSs are still not commonly deployed in buildings. Lack of appropriate in-building infrastructure coupled with the often prohibitively high installation and maintenance costs associated with a DCS means that many buildings still remain without adequate wireless communications service coverage. The issues of indoor network infrastructure cost and complexity are further compounded by the growth of new mobile technologies. For example, when a DCS is deployed as an in-building solution, the equipment in the DCS is configured with filters and other signal processing circuitry configured to support specific communications services and technologies (e.g., 2G, 3G, Wi-Fi, etc.). Thus, additional equipment that includes filtering circuits and/or other signal processing circuitry must be added for the DCS to support new communications services (i.e., new communications bands). Even more challenging is the fact that the addition of new communications services to a DCS may require modification to a network infrastructure and/or the installation of new equipment in the DCS.

Therefore, it is desired to provide a lower cost, in-building networking solution that enables the flexible addition of new communications services and/or modified communications services, including wireless communications services, to an existing installed DCS without undue tampering with the equipment of the installed DCS.

No admission is made that any reference cited herein constitutes prior art. Applicant expressly reserves the right to challenge the accuracy and pertinency of any cited documents.

SUMMARY

Embodiments of the disclosure relate to wideband digital distributed communications systems (DCSs) employing a programmable digital signal processing circuit for scaling supported communications services. In one exemplary aspect, a DCS is provided. The DCS includes a head-end unit that includes an analog front end signal processing circuit configured to receive analog downlink communications signals from one or more networks to support communications services (i.e., communications bands). The head-end unit is configured to distribute the analog downlink communications signals over downlink communication links to a plurality of remote units to be distributed to client devices. The remote units also include an analog front end signal processing circuit configured to receive analog uplink communications signals from the client devices to be distributed over uplink communication links to the head-end unit and back to the networks. The ability of the DCS to be flexibly scaled to support new analog communications bands and related communications services depends on analog front end signal processing circuits in the head-end unit and the remote units for processing the received analog communications signals. In this regard, in aspects disclosed herein, the front end signal processing circuit in the head-end unit and/or the remote units are either equipped with broadband filters, or such filters are eliminated to allow the DCS to be flexibly scalable to pass added communications bands. The analog front end processing circuit of the head-end unit and/or the remote units include an analog-to-digital conversion (ADC) circuit for converting received analog communications signals into digital communications signals so that the digital communications signals can be processed by a programmable digital signal processing circuit. The programmable digital signal processing circuit can flexibly be programmed and reconfigured, such as through software, to support signal processing functions (e.g., frequency conversion and filtering) for communications bands of the digitally converted analog communications signals. In this manner, the DCS can be easily programmed and reconfigured to support different and emerging communications services.

However, interference signals that may otherwise be rejected with narrower band filters may be passed by the front end signal processing circuit as a result of providing broadband filters or eliminating filters in the front end downlink signal processing circuitry, thereby reducing the dynamic range of the distributed communications signals. Thus, in embodiments disclosed herein, to prevent the reduction and/or restore the dynamic range of the communications signals, the ADC circuit in the front end processing circuit is configured to oversample the received analog communication signals for conversion into the digital communications signals. Oversampling eases the requirements on the filtering which may precede the ADC circuit. Providing a higher oversampling rate moves image frequencies for the communications services higher, thereby allowing a less complex lower cost filter with a wider transition band. Further, there is an increase in the signal-to-interference ratio (SIR) within the signal bandwidth because of the process gain. Thus, the digital communications signals can be filtered to reduce or eliminate the interference signals to restore the dynamic range of the communications signals. The digital signal processing circuit can also be configured to downsample (i.e., decimate) the digital communications signals to reduce or offset the increased bit resolution as a result of oversampling by the ADC circuit to control the transmission bit rate of the digital communications signals. In this manner, the required capacity of the communications links to distribute the digital communications signals can be reduced from the required capacity if decimation processing were not performed to reduce or control costs of the DCS when new communications services are added.

An additional embodiment of the disclosure relates to a signal distribution unit in a wideband digital wireless distribution system (WDS). The signal distribution unit comprises a transmission analog input communications interface coupled to a transmission communications path. The transmission analog input communications interface is configured to receive, from an analog radio frequency (RF) signal source, a transmission analog RF communications signal having a communications bandwidth for a communications service. The transmission communications path is configured to receive the transmission analog RF communications signal from the transmission analog input communications interface. The transmission communications path comprises a transmission analog-to-digital conversion (ADC) circuit configured to oversample a received transmission analog RF communications signal at a programmed transmission oversampling rate of at least twice the highest frequency in the communications bandwidth to generate a transmission digital RF communications signal representing a digitized form of the transmission analog RF communications signal. The transmission communications path also comprises a transmission programmable digital signal processing circuit. The transmission programmable digital signal processing circuit comprises a transmission digital filter circuit configured to digitally filter the transmission digital RF communication signals in a programmed transmission passband into a transmission filtered digital RF communications signal. The transmission programmable digital signal processing circuit also comprises a transmission digital downsampling circuit configured to downsample the transmission filtered digital RF communications signals at a programmed transmission downsample rate based on (e.g., equal to) the programmed transmission oversampling rate to generate a transmission downsampled digital RF communications signal. The signal distribution unit also comprises a transmission digital output communications interface coupled to the transmission communications path and at least one transmission communications link coupled to at least one signal receiver unit in the WDS. The transmission digital output communications interface is configured to distribute the transmission downsampled digital RF communications signal over the at least one transmission communications link to the at least one signal receiver unit.

An additional embodiment of the disclosure relates to a method of distributing an analog RF communications signal in a WDS. The method comprises receiving from an analog RF signal source, a transmission analog RF communications signal having a communications bandwidth for a communications service on a transmission communications path. The method also comprises oversampling the received transmission analog RF communications signal in the transmission communications path at a programmed transmission oversampling rate of at least twice the highest frequency in the communications bandwidth to generate a transmission digital RF communications signal representing a digitized form of the transmission analog RF communications signal. The method also comprises digitally filtering the transmission digital RF communications signal in the transmission communications path in a programmed transmission passband into a transmission filtered digital RF communications signal. The method also comprises downsampling the transmission filtered digital RF communications signals in the transmission communications path at a programmed transmission downsample rate based on (e.g., equal to) the programmed transmission oversampling rate to generate a transmission downsampled digital RF communications signal. The method also comprises distributing the transmission downsampled digital RF communications signal from the transmission communications path over at least one transmission communications link to the at least one signal receiver unit.

An additional embodiment of the disclosure relates to a WDS. The WDS comprises a head-end unit. The head-end unit comprises a head-end downlink analog input communications interface coupled to a head-end downlink communications path, the head-end downlink analog input communications interface configured to receive, from an analog RF signal source, a downlink analog RF communications signal having a communications bandwidth for a communications service. The head-end downlink communications path comprises a head-end downlink ADC circuit configured to oversample a received downlink analog RF communications signal at a programmed transmission oversampling rate of at least twice the highest frequency in the communications bandwidth to generate a downlink digital RF communications signal representing a digitized form of the downlink analog RF communications signal. The head-end downlink communications path also comprises a head-end transmission programmable digital signal processing circuit. The head-end transmission programmable digital signal processing circuit comprises a head-end downlink digital filter circuit configured to digitally filter the downlink digital RF communications signals in a programmed transmission passband into a downlink filtered digital RF communications signal. The head-end transmission programmable digital signal processing circuit also comprises a head-end downlink digital downsampling circuit configured to downsample the downlink filtered digital RF communications signals at a programmed transmission downsample rate based on (e.g., equal to) the programmed transmission oversampling rate to generate a downlink downsampled digital RF communications signal. The head-end unit also comprises a head-end downlink digital output communications interface coupled to the head-end downlink communications path and at least one transmission communications link coupled to at least one signal receiver unit in the WDS. The head-end downlink digital output communications interface is configured to distribute the downlink downsampled digital RF communications signal over the at least one downlink communications link to at least one remote antenna unit among a plurality of remote antenna units.

The at least one remote antenna unit among the plurality of remote antenna units comprises a remote downlink digital input communications interface coupled to a remote downlink digital communications path. The remote downlink digital input communications interface is configured to receive, from the at least one downlink communications link, the downlink downsampled digital RF communications signal. The remote downlink digital communications path comprises a remote downlink programmable digital signal processing circuit. The remote downlink programmable digital signal processing circuit comprises a remote downlink digital upsampling circuit configured to upsample the received downlink digital RF communications signals at a programmed reception upsample rate based on (e.g., equal to) the programmed transmission downsample rate to generate a downlink upsampled digital RF communications signal. The remote downlink programmable digital signal processing circuit also comprises a remote downlink digital filter circuit configured to digitally filter the downlink upsampled digital RF communication signals in a programmed reception passband into a downlink filtered upsampled digital RF communications signal. The remote downlink digital communications path also comprises a remote downlink digital-to-analog conversion (DAC) circuit. The remote downlink DAC circuit is configured to convert the downlink filtered upsampled digital RF communications signal into the downlink analog RF communications signal representing an analog form of the downlink filtered upsampled digital RF communications signal. The remote downlink digital communications path also comprises a remote downlink analog output communications interface configured to distribute the downlink analog RF communications signal to a client device.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to wideband digital distributed communications systems (DCSs) employing a programmable digital signal processing circuit for scaling supported communications services. In aspects disclosed herein, the front end signal processing circuits are either equipped with broadband filters, or such filters are eliminated to allow the DCS to be flexibly scalable to pass added communications bands. Thus, the DCS can be configured to be flexibly scaled to support new/emerging analog communications bands and related communications services. However, interference signals that may otherwise be rejected with narrower band filters may be passed by the front end signal processing circuits, thereby reducing the dynamic range of the distributed communications signals. Thus, in embodiments disclosed herein, to prevent the reduction and/or restore the dynamic range of the communications signals, an ADC circuit in the front end processing circuits is configured to oversample the received analog communication signals for conversion into the digital communications signals. The digital communications signals can be filtered to reduce or eliminate the interference signals to restore the dynamic range of the communications signals. The digital signal processing circuit can also be configured to downsample (i.e., decimate) the digital communications signals to reduce or offset the increased bit resolution as a result of oversampling by the ADC circuit to control the transmission bit rate of the digital communications signals. In this manner, the required capacity of the communications links to distribute the digital communications signals can be reduced from the required capacity if decimation processing were not performed to reduce or control costs of the DCS when new communications services are added.

Figure 1:
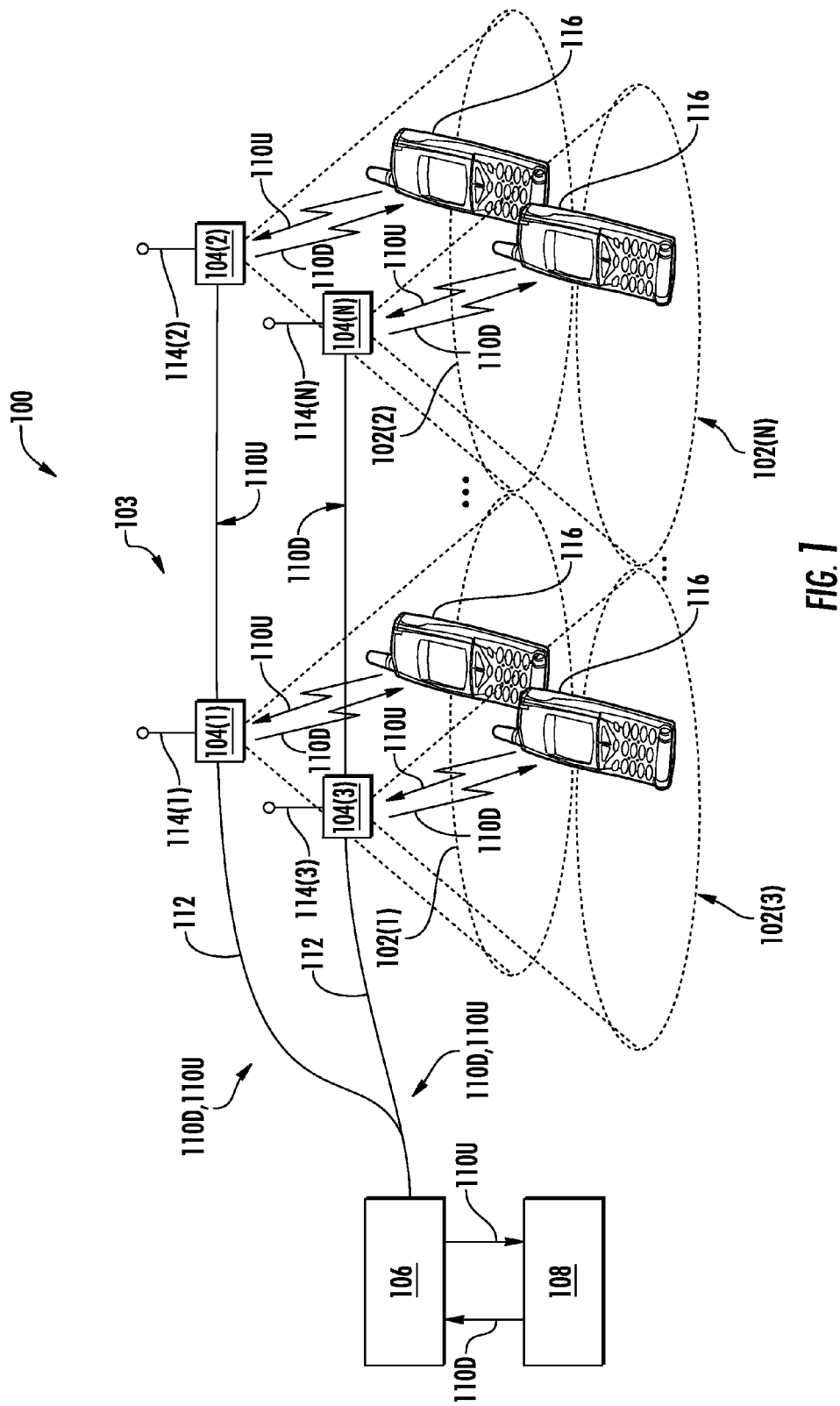
FIG. 1 is a schematic diagram of an exemplary distributed communications system (DC S)
Figure 2:
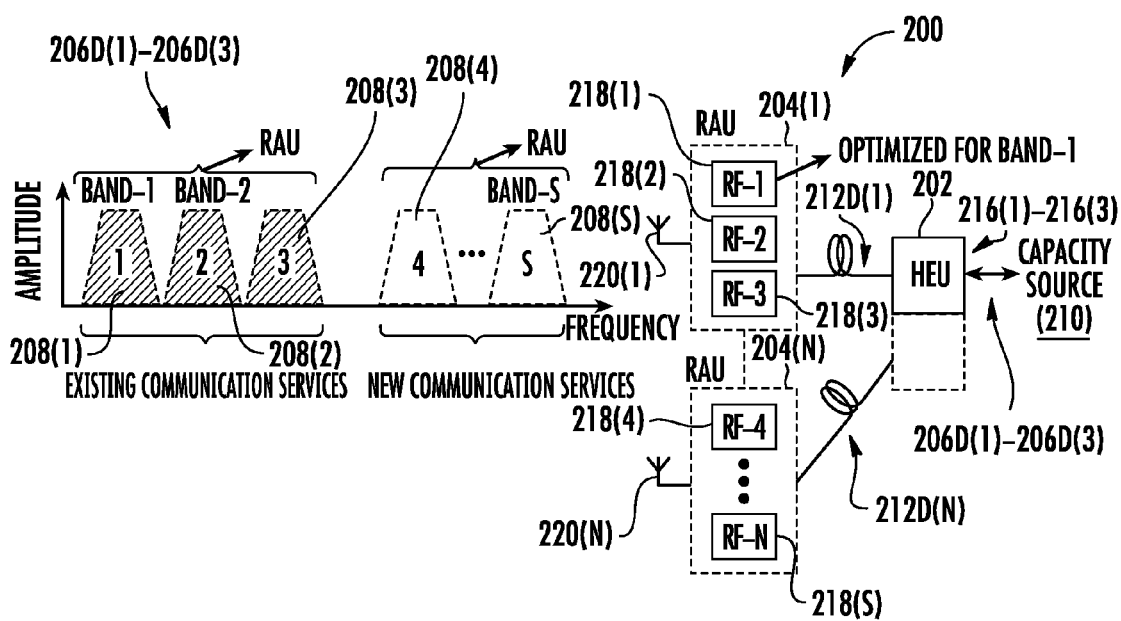
FIG. 2 is a schematic diagram of an exemplary DCS that includes front end processing circuits configured with narrower band filtering to pass communications bands for communications services.
Figure 3:
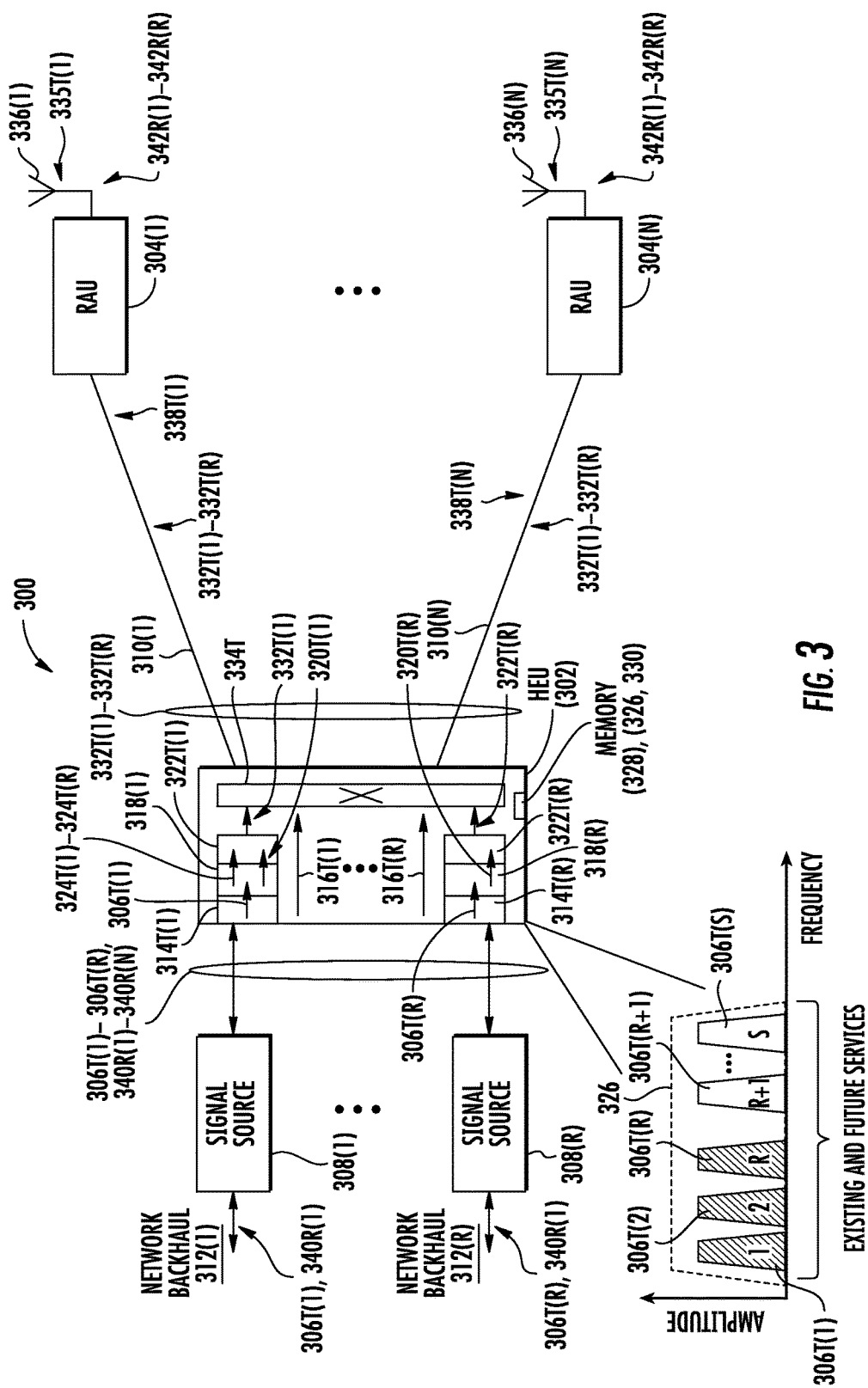
FIG. 3 is a schematic diagram of a wideband digital DCS employing a programmable digital processing signal circuit in a head-end unit and remote units for allowing the scaling of the DCS to support existing and new communications bands for existing and new communications services.

Example DCSs employing a programmable digital signal processing circuit for scaling supported communications services are discussed starting at FIG. 3, FIG. 2 is first discussed to illustrate expanding existing communications services supported by a DCS to include future communications services. FIG. 2 is a schematic diagram of an exemplary DCS 200 that includes a head-end unit (HEU) 202 communicatively coupled to a plurality of remote antenna units (RAUs) 204(1)-204(N). The HEU 202 is configured to receive analog downlink communication signals 206D(1)-206D(3) for existing communications services in respective communication bands 208(1)-208(3) from a capacity source 210. The HEU 202 is configured to distribute the received downlink communication signals 206D(1)-206D(3) over a downlink communications link 212D(1) to a first RAU 204(1). The HEU 202 includes signal processing circuits 216(1)-216(3) that include narrow band filters each configured to pass a respective communication band 208(1)-208(3) while rejecting signals, such as interference signals, outside of the respective communication bands 208(1)-208(3). The first RAU 204(1) receives the downlink communication signals 206D(1)-206D(3) over the downlink communications link 212D(1) and passes the downlink communication signals 206D(1)-206D(3) to three (3) remote signal processing circuits 218(1)-218(3) in this example. The signal processing circuits 218(1)-218(3) include narrow band filters configured to pass a respective communication band 208(1)-208(3). The first RAU 204(1) is configured to wirelessly transmit the downlink communication signals 206D(1)-206D(3) through one or more antennas 220(1) (220(2)-220(N) for the other RAUs 204(2)-204(N)).

It may be desired to expand the communication services supported by the DCS 200 beyond the communications services in three (3) communication bands 208(1)-208(3). For example, it may be desired to expand communication services supported by the DCS 200 to communications services communication bands 208(4)-208(S), wherein 'S' is the number of communications services supported. However, signal processing circuits 216(1)-216(3) in the HEU 202 are only configured to pass communication bands 208(1)-208(3). Thus, additional signal processing circuits would have to be added to the HEU 202 to support new communication bands 208(4)-208(S) for new communications services. Further, a RAU, such as RAU 204(N) shown in FIG. 2, would have to be configured with signal processing circuits 218(4)-218(S) to support the new communication bands 208(4)-208(S) at extra expense. Even more challenging is the fact that the addition of new communications services 208(4)-208(S) to the DCS 200 may require modification to a network infrastructure and/or the installation of new equipment in the DCS 200. What may be desired is to provide a DCS that can be configured to support new communications bands for new communications services without necessarily requiring new equipment or modifications to existing equipment.

In this regard, FIG. 3 is a schematic diagram of a wideband digital DCS 300 ("DCS 300") that employs programmable digital processing signal circuits in a head-end unit (HEU) 302 and remote antenna units (RAUs) 304(1)-304(N) for scaling the wideband digital DCS 300 to support existing and new communications bands for existing and new communications services. The HEU 302 may be a central unit or other processing circuit or system that is configured to receive transmission (e.g., downlink) analog RF communications signals 306T(1)-306T(R) from respective analog RF signal sources 308(1)-308(R) to be distributed over communications links 310(1)-310(N) to the RAUs 304(1)-304(N). Separate communications links could be provided for downlink and uplink communications for each communications link 310(1)-310(N), or each communications link 310(1)-310(N) could be configured to carry both downlink and uplink communications. The transmission analog RF communications signals 306T(1)-306T(R) correspond to particular communications services provided by the analog RF signal sources 308(1)-308(R). Each transmission analog RF communications signal 306T(1)-306T(R) has a particular communications bandwidth for its communications service. For example, the analog RF signal sources 308(1)-308(R) may be communicatively coupled to network backhauls 312(1)-312(R).

With continuing reference to FIG. 3, the HEU 302 includes transmission analog input communications interfaces 314T(1)-314T(R) that are each configured to receive a respective transmission analog RF communications signal 306T(1)-306T(R) into a respective transmission communications path 316T(1)-316T(R). A transmission analog-to-digital conversion (ADC) circuit 318(1)-318(R) is provided in each respective transmission communications path 316T(1)-316T(R) to oversample a respective received transmission analog RF communications signal 306T(1)-306T(R) at a defined oversampling rate. For example, the transmission oversampling rate may be configured to be at least twice the highest frequency in the communications band of the respective transmission analog RF communications signal 306T(1)-306T(R) within the communications bandwidth to generate a respective transmission digital RF communications signal 320T(1)-320T(R) representing a digitized form of the transmission analog RF communications signal 306T(1)-306T(R). Oversampling can ease the requirements on filtering which may be employed and precede the transmission ADC circuit 318(1)-318(R). The high oversampling rate moves the image frequencies higher, thereby allowing a less complex, lower cost filter with a wider transition band. Also, there is an increase in the signal-to-interference ratio (SIR) within the signal bandwidth in the generated transmission digital RF communications signal 320T(1)-320T(R) because of the process gain. In this manner, the HEU 302 may be more easily adapted to adding future communication services, because the filtering passband that is included in the HEU 302 that precedes the transmission ADC circuits 318(1)-318(R) can be relaxed or the front end filtering can be eliminated altogether. Interference signals that are passed by HEU 302 as a result of providing broadband filters or eliminating filters can then be more easily filtered without decreasing the SIR. This allows for the HEU 302 to more easily support additional future communications services, such as the transmission analog RF communication signal 306T(R+1)-306T(S) shown in FIG. 3, without necessarily having to add new front end processing circuits that include narrower passbands particular to the future communications services to the HEU 302. For example, interference signals can come from external sources such as macrocells.

With continuing reference to FIG. 3, after the transmission analog RF communications signals 306T(1)-306T(R) are converted by the transmission ADC circuits 318(1)-318(R) to the transmission digital RF communications signals 320T(1)-320T(R), the transmission digital RF communications signals 320T(1)-320T(R) can be filtered and further processed. In this regard, a transmission programmable digital signal processing circuit 322T(1)-322T(R) is provided in each respective transmission communications path 316T(1)-316T(R). The transmission programmable digital signal processing circuit 322T(1)-322T(R) can be configured to digitally filter the transmission digital RF communications signal 320T(1)-320T(R) in a programmed transmission passband into a transmission filtered digital RF communications signals 324T(1)-324T(R). The programmed transmission passband may be stored in a transmission passband entry 326 in memory 328 such that the transmission programmable digital signal processing circuit 322T(1)-322T(R) can access the memory 328 to provide the digital filter passband settings. In this manner, the transmission programmable digital signal processing circuit 322T(1)-322T(R) can be reconfigured without the need for new circuits or hardware to be added to the HEU 302 to provide the desired digital filter passband settings based on the communication services to be supported by the wideband digital DCS 300.

While oversampling the transmission analog RF communications signal 306T(1)-306T(R) in the ADC circuits 318(1)-318(R) allows for easier digital filtering in the transmission programmable digital signal processing circuit 322T(1)-322T(R) with a higher SIR, the bit rate of the transmission digital RF communications signal 320T(1)-320T(R) is increased as a result. This is because more samples of the transmission analog RF communications signal 306T(1)-306T(R) are taken by the ADC circuits 318(1)-318(R) over a given period of time. This would increase the bit transmission rate of the transmission digital RF communications signal 320T(1)-320T(R) over the communications links 310(1)-310(N) to the RAUs 304(1)-304(N). This may increase the cost of the wideband digital DCS 300 by having to increase the bit rate transmission capacity and/or be an overlimiting factor in the number of communication services that can be supported. Thus, in the HEU 302 in FIG. 3, the transmission programmable digital signal processing circuits 322T(1)-322T(R) in this example are additionally configured to downsample (i.e., decimate) the transmission filtered digital RF communications signals 324T(1)-324T(R) to reduce or offset the increased bit resolution as a result of oversampling by the transmission ADC circuits 318(1)-318(R) to control the transmission bit rate. In this manner, the required capacity of the communications links 310(1)-310(N) to distribute the digital communications signals can be reduced from the required capacity if decimation processing were not performed to reduce or control costs of the wideband digital DCS 300 when new communications services are added. Or, for the same capacity of the communications links 310(1)-310(N), a greater number of communications services can be supported by the wideband digital DCS 300. In this example, the transmission programmable digital signal processing circuits 322T(1)-322T(R) are configured to downsample the transmission filtered digital RF communications signals 324T(1)-324T(R) at a programmed transmission downsample rate stored in a programmed transmission downsample entry 330 to generate respective transmission downsampled digital RF communications signals 332T(1)-332T(R). A transmission digital output communications interface 334T coupled to the transmission communications path and communications links 310(1)-310(N) is configured to distribute the transmission downsampled digital RF communications signals 332T(1)-332T(R) over the communications links 310(1)-310(N) to the RAUs 304(1)-304(N) acting as signal receiver units.

Figure 4:
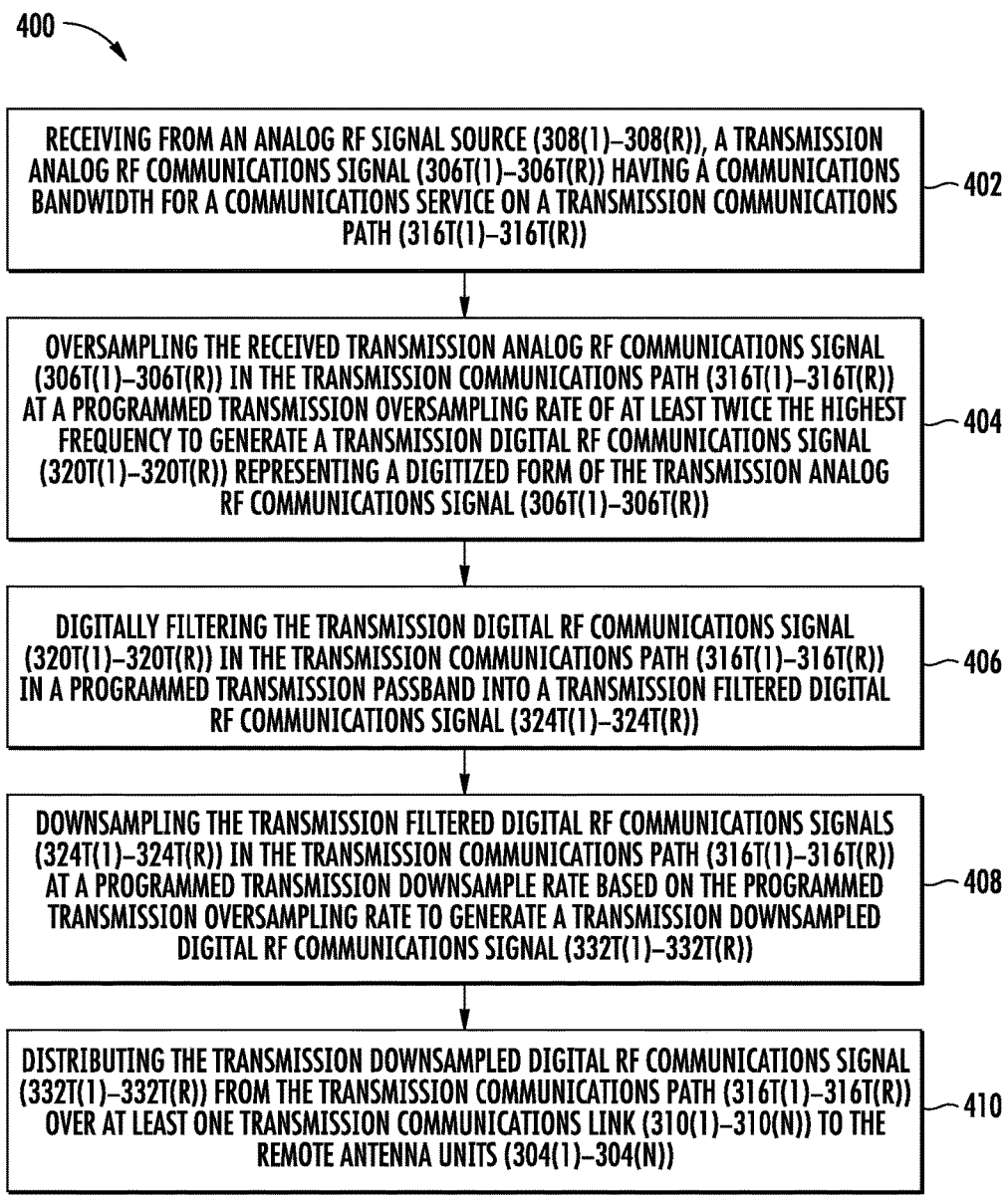
FIG. 4 is a flowchart illustrating an exemplary process of a signal distribution unit in the form of a head-end unit in the wideband digital DCS in FIG. 3 processing received analog downlink communications signals to be distributed to remote units as signal receiver units.

FIG. 4 is a flowchart illustrating an exemplary process 400 of the HEU 302 as a signal distribution unit in the wideband digital DCS 300 in FIG. 3 processing received transmission analog RF communications signals 306T(1)-306T(R). The first step is receiving from the analog signal source 308(1)-308(R), the transmission analog RF communications signal 306T(1)-306T(R) having a communications bandwidth for a communications service on a transmission communications path 316T(1)-316T(R) (block 402). The next step involves the ADC circuits 318(1)-318(R) oversampling the received transmission analog RF communications signals 306T(1)-306T(R) in the transmission communications path 316T(1)-316T(R) at a programmed transmission oversampling rate of at least twice the highest frequency in the communications bandwidth to generate a transmission digital RF communications signal 320T(1)-320T(R) representing a digitized form of the transmission analog RF communications signal 306T(1)-306T(R) (block 404). The next step involves a transmission programmable digital signal processing circuit 322T(1)-322T(R) digitally filtering the transmission digital RF communications signal 320T(1)-320T(R) in the transmission communications path 316T(1)-316T(R) in a programmed transmission passband into a transmission filtered digital RF communications signal 324T(1)-324T(R) (block 406). The next step involves the transmission programmable digital signal processing circuit 322T(1)-322T(R) downsampling the transmission filtered digital RF communications signals 324T(1)-324T(R) in the transmission communications path 316T(1)-316T(R) at a programmed transmission downsample rate based on the programmed transmission oversampling rate to generate a transmission downsampled digital RF communications signal 332T(1)-332T(R) (block 408). It may be common in one non-limiting example for the programmed reception downsample rate to be equal or approximately equal to the programmed reception upsample rate. The next step involves distributing the transmission downsampled digital RF communications signal 332T(1)-332T(R) from the transmission communications path 316T(1)-316T(R) over at least one transmission communications link 310(1)-310(N) to the RAUs 304(1)-304(N) (block 410).

Further, with reference back to FIG. 3, the RAUs 304(1)-304(N) are configured to wirelessly receive transmission analog RF communications signals 335T(1)-335T(N) (e.g., uplink RF communications signals) over respective antennas 336(1)-336(N) from client devices. The RAUs 304(1)-304(N) are also configured to distribute the received transmission analog RF communications signals 335T(1)-335T(N) as transmission signal units over the communications links 310(1)-310(N) to the HEU 302 to be distributed on the network backhauls 312(1)-312(R). In this regard, both the HEU 302 and the RAUs 304(1)-304(N) in the wideband digital DCS 300 in FIG. 3 are signal distribution units. As will be discussed in more detail below, the RAUs 304(1)-304(N) may also include ADC circuits and digital signal processing circuits for programmably oversampling, filtering, and downsampling the received transmission analog RF communications signals 335T(1)-335T(N) to generate downsampled digital RF communications signals 338T(1)-338T(N) to be distributed to the HEU 302. This also allows the RAUs 304(1)-304(N) to more easily support new communication services while reducing the bit rate transmission of signals from the RAUs 304(1)-304(N) to the HEU 302. In this regard, the process in FIG. 4 can also be employed by the RAUs 304(1)-304(N) acting as a signal distribution unit in the wideband digital DCS 300 in FIG. 3 to process received transmission analog RF communications signals 335T(1)-335T(N) to generate the downsampled digital RF communications signals 338T(1)-338T(N) to be distributed to the HEU 302.

As will also be discussed in more detail below, the HEU 302 and the RAUs 304(1)-304(N) are also signal reception units in that they receive the respective downsampled digital RF communications signals 332T(1)-332T(R), 338T(1)-338T(N) respectively, from the RAUs 304(1)-304(N) and the HEU 302. As will be also discussed in more detail below, as signal reception units, the HEU 302 and the RAUs 304(1)-304(N) are configured to upsample the respective downsampled digital RF communications signals 338T(1)-338T(N), 332T(1)-332T(R) and convert such signals back into reception analog RF communications signals 340R(1)-340R(N), 342R(1)-342R(R) to be distributed to the analog RF signal sources 308(1)-308(R) and the antennas 336(1)-336(N) to client devices, respectively.

Figure 5A:
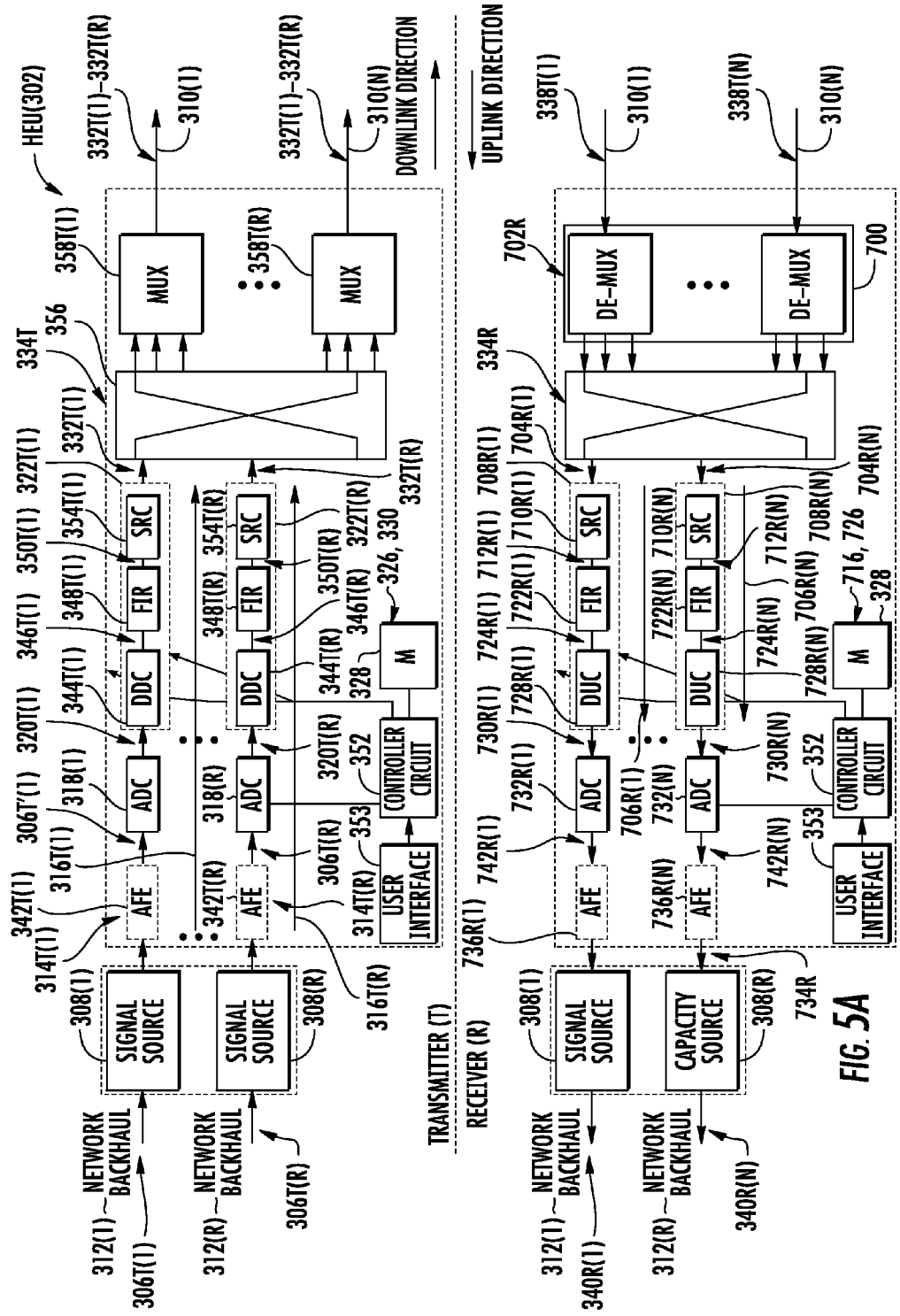
FIG. 5A is a schematic diagram illustrating more detail of the head-end unit in the wideband digital DCS of FIG. 3 employing a programmable digital processing signal circuit for allowing the scaling of the DCS to support existing and new communications bands for existing and new communications services.

FIG. 5A is a schematic diagram illustrating more detail of the HEU 302 in the wideband digital DCS 300 of FIG. 3. The transmitter (T) side (i.e., downlink) of the HEU 302 is shown in the upper portion of FIG. 5A. The receiver (R) side (i.e., uplink) of the HEU 302 is shown in the lower portion of FIG. 5A. As previously discussed with regard to the wideband digital DCS 300 in FIG. 3, the transmitter side of the HEU 302 includes the transmission analog input communications interfaces 314T(1)-314T(R) in respective transmission communications paths 316T(1)-316T(R) for receiving the transmission analog RF communications signals 306T(1)-306T(R) from the analog RF signal sources 308(1)-308(R). In this example, the transmission analog input communications interfaces 314T(1)-314T(R) each include a transmission analog front end processing circuit 342T(1)-342T(R). The transmission analog front end processing circuits 342T(1)-342T(R) may include a front end filtering circuit, which may be a wideband filter circuit, configured to filter the received transmission analog RF communications signal 306T(1)-306T(R) into a transmission filtered analog RF communications signal 306T'(1)-306T'(R). Alternatively, the transmission analog front end processing circuits 342T(1)-342T(R) may not include any filtering of the transmission analog RF communications signal 306T(1)-306T(R). The transmission ADC circuits 318(1)-318(R) are configured to oversample the received transmission filtered analog RF communications signals 306T'(1)-306T'(R) at the programmed transmission oversampling rate to generate the transmission digital RF communications signals 320T(1)-320T(R) representing the digitized form of the transmission filtered analog RF communications signals 306T'(1)-306T'(R).

With continuing reference to FIG. 5A, the transmission communications paths 316T(1)-316T(R) also include the transmission programmable digital signal processing circuits 322T(1)-322T(R). The transmission programmable digital signal processing circuits 322T(1)-322T(R) each include optional transmission digital downlink conversion (DDC) circuits 344T(1)-344T(R) each configured to downconvert the frequency of the transmission digital RF communications signals 320T(1)-320T(R) into transmission baseband (e.g., I/Q) digital RF communications signals 346T(1)-346T(R). For example, the transmission baseband (e.g., I/Q) digital RF communications signals 346T(1)-346T(R) may be communicated according to the common public radio interface (CPRI) protocol as an example. The transmission baseband digital RF communications signals 346T(1)-346T(R) are then digitally filtered by transmission digital filter circuits 348T(1)-348T(R) in a programmed transmission passband into the transmission filtered baseband digital RF communications signals 350T(1)-350T(R). As previously discussed, the programmed transmission passband rate may be stored in the transmission passband entry 326 in the memory 328. A controller circuit 352 is provided that is configured to read the programmed transmission passband rate in the transmission passband entry 326 from memory 328 and configure the transmission digital filter circuits 348T(1)-348T(R) to filter the transmission baseband digital RF communications signals 346T(1)-346T(R) in the programmed, desired transmission passbands. In this manner, the transmission digital filter circuits 348T(1)-348T(R) in the transmission programmable digital signal processing circuits 322T(1)-322T(R) can be configured and reconfigured to pass any desired transmission passbands to provide for expansion and reconfiguration of supported communications services. A user interface 353 may be provided in the HEU 302 that allows a user or other system to direct the controller circuit 352 to program the desired transmission passband rate in memory 328 for use by transmission programmable digital signal processing circuits 322T(1)-322T(R) in digitally filtering the transmission baseband digital RF communications signals 346T(1)-346T(R).

With continuing reference to FIG. 5A, transmission digital downsampling circuits 354T(1)-354T(R) are also provided in the transmission programmable digital signal processing circuits 322T(1)-322T(R) to downsample the transmission filtered baseband digital RF communications signals 350T(1)-350T(R) at a programmed transmission downsample rate based on (e.g., equal or substantially equal to) the programmed transmission oversampling rate to generate the transmission downsampled digital RF communications signals 332T(1)-332T(R). As discussed above, downsampling the transmission filtered baseband digital RF communications signals 350T(1)-350T(R) can reduce the bit transmission rate of the transmission downsampled digital RF communications signals 332T(1)-332T(R) communicated over the communications links 310(1)-310(N) to the RAUs 304(1)-304(N) (shown in FIG. 3). As previously discussed, the programmed transmission downsample rate may be stored in the transmission downsample entry 330 in memory 328. The controller circuit 352 is configured to read the programmed transmission downsample rate from the transmission downsample entry 330 in memory 328 and configure transmission digital downsampling circuits 354T(1)-354T(R) to downsample the transmission filtered baseband digital RF communications signals 350T(1)-350T(R) to the desired sample rate. The user interface 353 may be configured to allow a user or other system to direct the controller circuit 352 to program the desired transmission downsample rate in memory 328 for use by transmission digital downsampling circuits 354T(1)-354T(R) in downsampling transmission filtered baseband digital RF communications signals 350T(1)-350T(R).

With continuing reference to FIG. 5A, the HEU 302 includes the transmission digital output communications interface 334T configured to receive and distribute the transmission downsampled digital RF communications signals 332T(1)-332T(R) over the selected communications links 310(1)-310(N) to the RAUs 304(1)-304(N). The transmission digital output communications interface 334T may include a switch matrix circuit 356, which is a R×N matrix in this example. The switch matrix circuit 356 is configured to receive the transmission downsampled digital RF communications signals 332T(1)-332T(R) and route the transmission downsampled digital RF communications signals 332T(1)-332T(R) to the RAUs 304(1)-304(N). A plurality of transmission multiplexer circuits 358T(1)-358T(R) is configured to selectively route the transmission downsampled digital RF communications signals 332T(1)-332T(R) to the desired communications links 310(1)-310(N) to be distributed to the RAUs 304(1)-304(N).

FIG. 5A also shows the receiver (R) side of the HEU 302 for processing received downsampled digital RF communications signals 338T(1)-338T(N) from the RAUs 304(1)-304(N). However, the receiver (R) side of the RAU 304 will next be discussed with regard to FIG. 5B to complete the discussion of the transmission of downsampled digital RF communications signals 332T(1)-332T(R) to client devices.

Figure 5B:
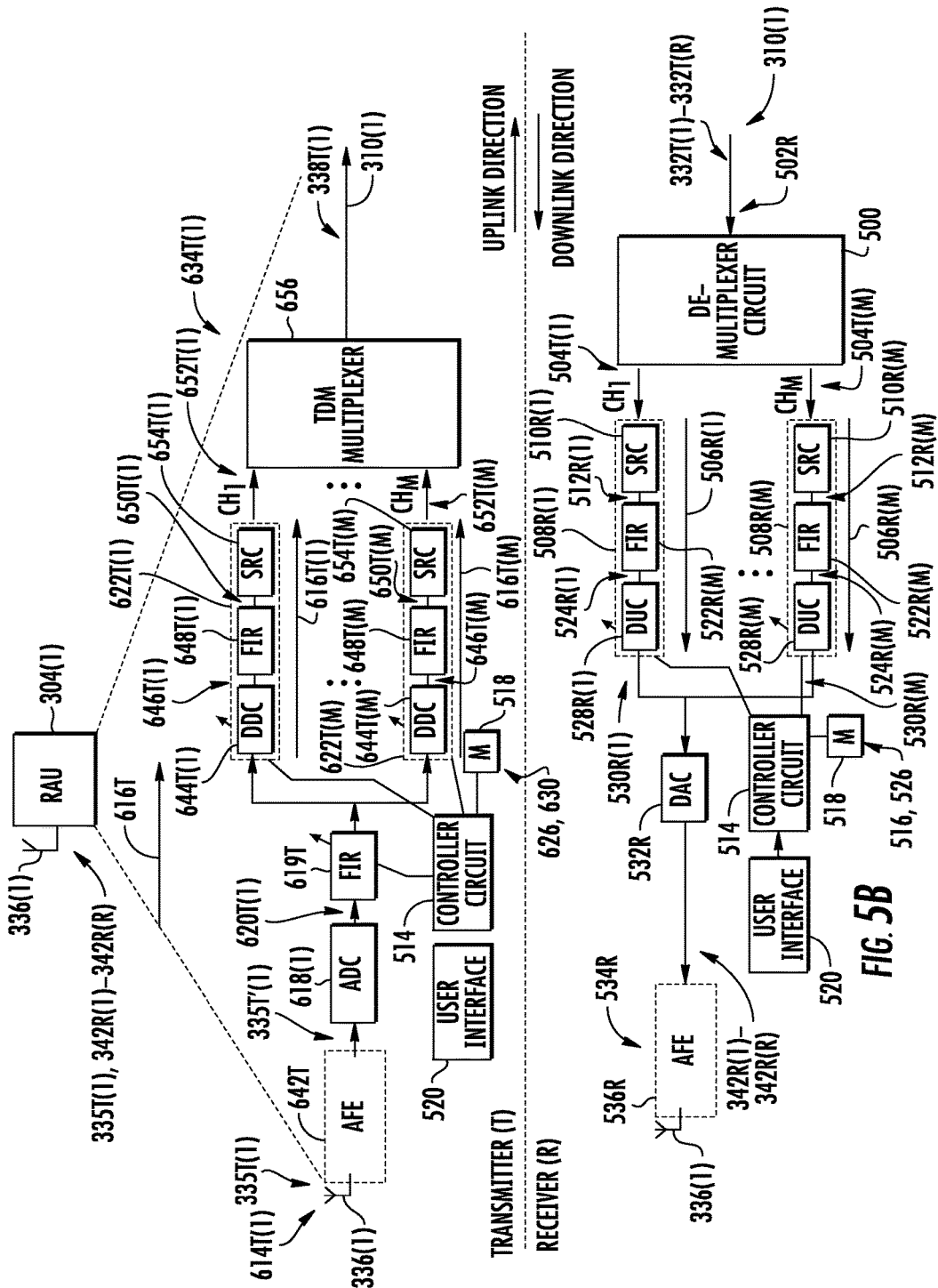
FIG. 5B is a schematic diagram illustrating more detail of a remote antenna unit (RAU) that can be employed in the wideband digital DCS of FIG. 3 employing a programmable digital processing signal circuit for allowing the scaling of the DCS to support existing and new communications bands for existing and new communications services.

In this regard, FIG. 5B is a schematic diagram illustrating more detail of a RAU 304 using RAU 304(1) as an example employed in the wideband digital DCS 300 of FIG. 3 employing a programmable digital processing signal circuit for allowing the scaling of the DCS to support existing and new communications bands for existing and new communications services. As shown in the receiver (R) side of the RAU 304(1) in the lower portion of FIG. 5B, the transmission downsampled digital RF communications signals 332T(1)-332T(R) are received in the RAU 304 according to the routing provided by the transmission digital output communications interface 334T in the HEU 302. The RAU 304(1) includes a demutiplexer circuit 500 as part of a reception digital input communications interface 502R that receives the transmission downsampled digital RF communications signals 332T(1)-332T(R) from the communications link 310(1) and separates the transmission downsampled digital RF communications signals 332T(1)-332T(R) into transmission downsampled digital RF communications signals (e.g., channels) 504T(1)-504T(M) in a plurality of reception digital communications paths 506R(1)-506R(M). The reception digital communications paths 506R(1)-506R(M) each include reception programmable digital signal processing circuits 508R(1)-508R(M). Each reception programmable digital signal processing circuit 508R(1)-508R(M) includes a reception digital upsampling circuit 510R(1)-510R(M) each configured to upsample the transmission downsampled digital RF communications signal 504T(1)-504T(M) at a programmed reception upsample rate based on the programmed transmission downsample rate to generate reception upsampled digital RF communications signals 512R(1)-512R(M), because of the downsampling performed in the HEU 302. For example, the programmed reception upsample rate and the programmed reception downsample rate can be equal. A controller circuit 514 is provided that is configured to read the programmed reception upsample rate in a reception upsample entry 516 from a memory 518 and configure the reception digital upsampling circuits 510R(1)-510R(M) to upsample transmission downsampled digital RF communications signal 504T(1)-504T(M) in the programmed, desired upsample rate. In this manner, the reception digital upsampling circuits 510R(1)-510R(M) in the reception programmable digital signal processing circuits 508R(1)-508R(M) can be configured and reconfigured to upsample at any desired umsampling rate to provide for expansion and reconfiguration of supported communications services. A user interface 520 may be provided in the RAU 304(1) that allows a user or other system to direct the controller circuit 514 to program the reception upsample rate in memory 518 for use by reception digital upsampling circuits 510R(1)-510R(M) in upsampling transmission downsampled digital RF communications signal 504T(1)-504T(M).

With continuing reference to FIG. 5B, the reception programmable digital signal processing circuits 508R(1)-508R(M) also include a respective reception digital filter circuit 522R(1)-522R(M). The reception digital filter circuits 522R(1)-522R(M) are each configured to digitally filter the reception upsampled digital RF communications signals 512R(1)-512R(M) in a programmed reception passband into reception filtered upsampled digital RF communications signals 524R(1)-524R(M). The controller circuit 514 is configured to read the programmed reception passband in a reception passband entry 526 from the memory 518 and configure the reception digital filter circuit 522R(1)-522R(M) to digitally filter the reception upsampled digital RF communications signals 512R(1)-512R(M) in the programmed, desired pass band. In this manner, the reception digital filter circuit 522R(1)-522R(M) in the reception programmable digital signal processing circuits 508R(1)-508R(M) can be configured and reconfigured to upsample at any desired filtering passband to provide for expansion and reconfiguration of supported communications services. The user interface 520 in the RAU 304(1) can be configured to allow a user or other system to direct the controller circuit 514 to program the desired reception passband rate in memory 518 for use by the reception digital filter circuit 522R(1)-522R(M) in digitally filtering the reception upsampled digital RF communications signals 512R(1)-512R(M).

With continuing reference to FIG. 5B, reception programmable digital signal processing circuits 508R(1)-508R(M) also include optional reception digital uplink conversion (DUC) circuits 528R(1)-528R(M) configured to upconvert from baseband frequency, the frequency of the reception filtered upsampled digital RF communications signals 524R(1)-524R(M) into reception digital RF communications signals 530R(1)-530R(M). The frequency upconversion may be to the original frequency of the transmission digital RF communications signals 320T(1)-320T(R) in the HEU 302 (see FIG. 5A). A reception digital-to-analog conversion (DAC) circuit 532R is provided that is configured to convert the combined reception digital RF communications signals 530R(1)-530R(M) into the reception analog RF communications signals 342R(1)-342R(R) representing an analog form of the reception digital RF communications signals 530R(1)-530R(M). The reception analog RF communications signals 342R(1)-342R(R) are directed to a reception analog output communications interface 534R that includes a reception analog front end processing circuit 536R. The reception analog front end processing circuit 536R may be configured to further process the reception analog RF communications signals 342R(1)-342R(R) to prepare the reception analog RF communications signals 342R(1)-342R(R) to be transmitted over the antenna 336(1).

Figure 6:
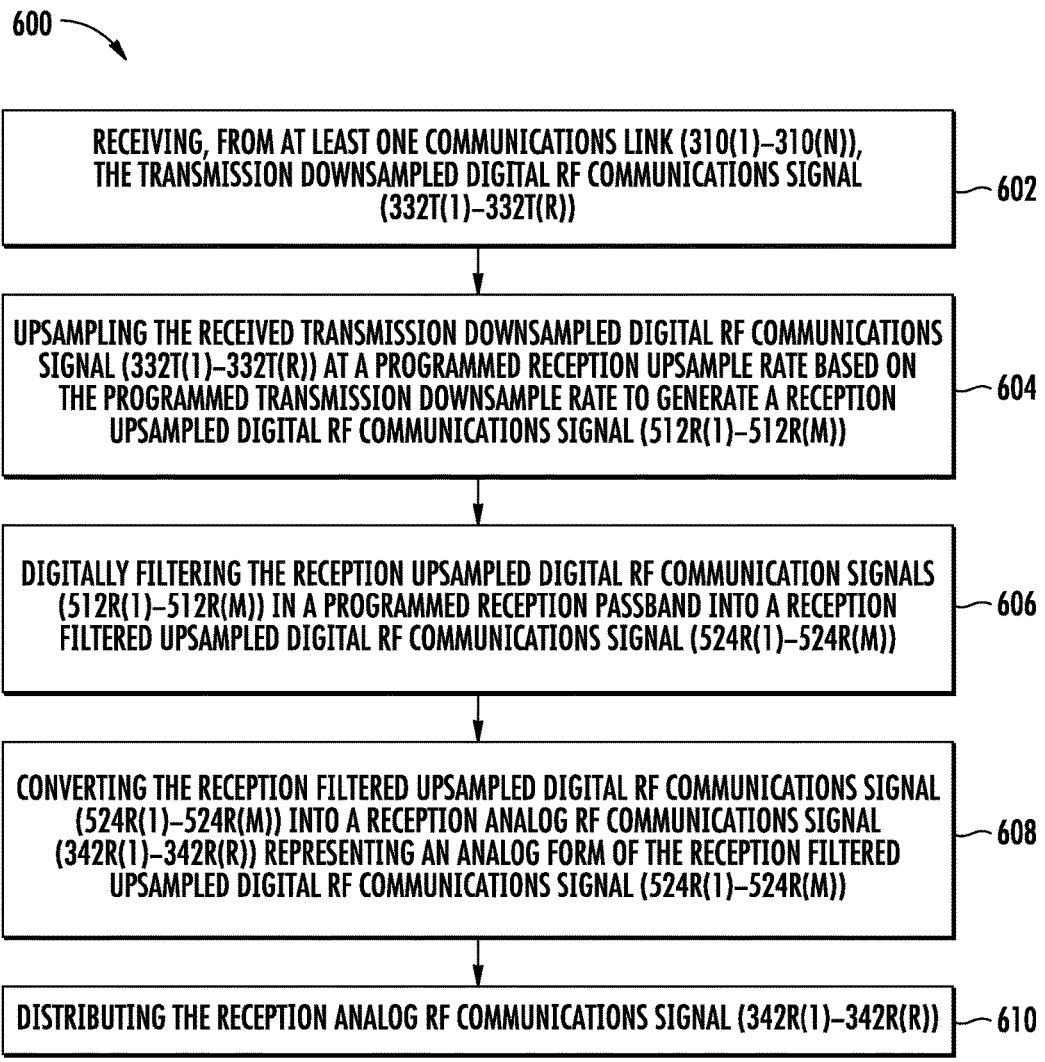
FIG. 6 is a flowchart illustrating an exemplary process of a signal reception unit in the form of a RAU in the wideband digital DCS in FIG. 3 processing received digital RF communications signals from a head-end unit to be distributed to client devices.

FIG. 6 is a flowchart illustrating an exemplary process 600 of the RAU 304 as a signal reception unit in the wideband digital DCS 300 in FIG. 5B processing the received transmission downsampled digital RF communications signals 332T(1)-332T(R) from the HEU 302. In this regard, a first step involves the reception digital input communications interface 502R receiving, from at least one communications link 310(1)-310(N), the transmission downsampled digital RF communications signal 332T(1)-332T(R) (block 602). A next step in the process 600 involves a reception digital upsampling circuit 510R(1)-510R(M) upsampling the received transmission downsampled digital RF communications signal 332T(1)-332T(R) at a programmed reception upsample rate based on (e.g., equal or substantially equal to) the programmed transmission downsample rate to generate a reception upsampled digital RF communications signal 512R(1)-512R(M) (block 604). In a next step, the process 600 involves a reception digital filter circuit 522R(1)-522R(M) digitally filtering the reception upsampled digital RF communications signal 512R(1)-512R(M) in a programmed reception passband into a reception filtered upsampled digital RF communications signal 524R(1)-524R(M) (block 606). A next step in the process 600 involves a reception DAC circuit 532R converting the reception filtered upsampled digital RF communications signal 524R(1)-524R(M) into a reception analog RF communications signal 342R(1)-342R(R) representing an analog form of the reception filtered upsampled digital RF communications signal 524R(1)-524R(M) (block 608). A next step in the process 600 then involves distributing the reception analog RF communications signal 342R(1)-342R(R), such as to an antenna 336 to be transmitted to client devices (block 610). The process 600 in FIG. 6 can also be employed by the HEU 302 acting a signal reception unit in the wideband digital DCS 300 in FIG. 3 to process received downsampled digital RF communications signals 338T(1)-338T(N) to be distributed to the analog RF signal sources 308(1)-308(R).

FIG. 5B also illustrates more detail of transmitter (T) side of the RAU 304(1) in the wideband digital DCS 300 of FIG. 3. The transmitter (T) side (i.e., uplink) of the RAU 304(1) is shown in the upper portion of FIG. 5B. The transmitter side of the RAU 304(1) includes a transmission analog input communications interface 614T(1) in a transmission communications path 616T for receiving the transmission analog RF communications signal 335T(1) from a client device over antenna 336(1). In this example, the transmission analog input communications interface 614T(1) includes a transmission analog front end processing circuit 642T. The transmission analog front end processing circuit 642T(1) may include a front end filtering circuit, which may be a wideband filter circuit, configured to filter the received transmission analog RF communications signal 335T(1) into a transmission filtered analog RF communications signal 335T'(1). Alternatively, the transmission analog front end processing circuit 642T(1) may not include any filtering of the transmission analog RF communications signal 335T(1). A transmission ADC circuit 618(1) is configured to oversample the received transmission filtered analog RF communications signal 335T'(1) at the programmed transmission oversampling rate to generate a transmission filtered digital RF communications signal 620T(1) representing the digitized form of the transmission filtered analog RF communications signal 335T'(1). A programmable digital filtering circuit 619T may also be provided to further filter the transmission filtered digital RF communications signal 620T(1) to generate transmission filtered digital RF communications signal 620T(1) to reduce the SIR. The passbands of programmable digital filtering circuit 619T may be configured to be programmed by the controller circuit 514.

With continuing reference to FIG. 5B, the transmission filtered digital RF communications signal 620T(1) is split among transmission communications paths 616T(1)-616T(M) which also include the transmission programmable digital signal processing circuits 622T(1)-622T(M). The transmission programmable digital signal processing circuits 622T(1)-622T(M) each include optional transmission DDC circuits 644T(1)-644T(M) each configured to downconvert the frequency of the transmission filtered digital RF communications signal 620T(1) into transmission baseband (e.g., I/Q) digital RF communications signals 646T(1)-646T(M). The transmission baseband digital RF communications signals 646T(1)-646T(M) are then digitally filtered by transmission digital filter circuits 648T(1)-648T(M) in a programmed transmission passband into the transmission filtered baseband digital RF communications signals 650T(1)-650T(M). As previously discussed, the programmed transmission passband rate may be stored in the transmission passband entry 626 in the memory 518. The controller circuit 514 is configured to read the programmed transmission passband rate in the transmission passband entry 626 from memory 518 and configure the transmission digital filter circuits 648T(1)-648T(M) to filter the transmission baseband digital RF communications signals 646T(1)-646T(M) in the programmed, desired transmission passbands. In this manner, the transmission digital filter circuits 648T(1)-648T(M) in the transmission programmable digital signal processing circuits 622T(1)-622T(M) can be configured and reconfigured to pass any desired transmission passbands to provide for expansion and reconfiguration of supported communications services. The user interface 520 allows a user or other system to direct the controller circuit 514 to program the desired transmission passband rate in memory 518 for use by transmission programmable digital signal processing circuits 622T(1)-622T(M) in digitally filtering the transmission baseband digital RF communications signals 646T(1)-646T(M).

With continuing reference to FIG. 5B, transmission digital downsampling circuits 654T(1)-654T(M) are also provided in the transmission programmable digital signal processing circuits 622T(1)-622T(M) to downsample the transmission filtered baseband digital RF communications signals 650T(1)-650T(M) at a programmed transmission downsample rate based on (e.g., equal or substantially equal to) the programmed transmission oversampling rate to generate the transmission downsampled digital RF communications signals 652T(1)-652T(M). As discussed above, downsampling the transmission filtered baseband digital RF communications signals 650T(1)-650T(M) can reduce the bit transmission rate of the transmission downsampled digital RF communications signals 652T(1)-652T(M) communicated over the communications links 310(1)-310(N) to the RAUs 304(1)-304(N). As previously discussed, the programmed transmission downsample rate may be stored in the transmission downsample entry 630 in memory 518. The controller circuit 514 is configured to read the programmed transmission downsample rate from the transmission downsample entry 630 in memory 518 and configure transmission digital downsampling circuits 654T(1)-654T(M) to downsample the transmission filtered baseband digital RF communications signals 650T(1)-650T(M) to the desired sample rate. The user interface 520 may be configured to allow a user or other system to direct the controller circuit 514 to program the desired transmission downsample rate in memory 518 for use by transmission digital downsampling circuits 654T(1)-654T(M) in downsampling transmission filtered baseband digital RF communications signals 650T(1)-650T(M).

With continuing reference to FIG. 5B, the RAU 304(1) includes a transmission digital output communications interface 634T(1) configured to receive and distribute the transmission downsampled digital RF communications signals 652T(1)-652T(M) over the selected communications links 310(1)-310(N) to the HEU 302. The transmission digital output communications interface 634T(1) may include a time-divisional multiplexer (TDM) circuit 656 to distribute the downsampled digital RF communications signals 652T(1)-652T(M) in different time slots as downsampled digital RF communications signals 338T(1) to the HEU 302 over the communications link 310(1).

The downsampled digital RF communications signals 338T(1) communicated from the RAU 304(1) to the HEU 302 over communications link 310(1) and the other downsampled digital RF communications signals 338T(2)-338T(N) from the other RAUs 304(2)-304(N) communicated over communication links 310(2)-310(N), are received by the receiver (R) side of the HEU 302 shown in FIG. 5A. The receiver side of the HEU 302 in FIG. 5A will now be discussed.

As shown in the receiver (R) side of the HEU 302 in the lower portion of FIG. 5A, the downsampled digital RF communications signals 338T(1)-338T(N) are received in the HEU 302. The HEU 302 includes a demutiplexer circuit 700 as part of a reception digital input communications interface 702R that receives the downsampled digital RF communications signals 338T(1)-338T(N) from the communications links 310(1)-310(N) and routes the downsampled digital RF communications signals 338T(1)-338T(N) in the reception digital output communication interface 334R, provided in the form of a switching matrix circuit 356 in this example, into reception downsampled digital RF communications signals (e.g., channels) 704R(1)-704R(N) in a plurality of reception digital communications paths 706R(1)-706R(M). The reception digital communications paths 706R(1)-706R(N) each include reception programmable digital signal processing circuits 708R(1)-708R(N). Each reception programmable digital signal processing circuit 708R(1)-708R(N) includes a reception digital upsampling circuit 710R(1)-710R(N) each configured to upsample the reception downsampled digital RF communications signal 704R(1)-704R(N) at a programmed reception upsample rate based on (e.g., equal or substantially equal to) the programmed transmission downsample rate to generate reception upsampled digital RF communications signals 712R(1)-712R(N), because of the downsampling performed in the HEU 302. A controller circuit 352 is provided that is configured to read the programmed reception upsample rate in a reception upsample entry 716 from the memory 328 and configure the reception digital upsampling circuits 710R(1)-710R(N) to upsample reception downsampled digital RF communications signals 704R(1)-704R(N) in the programmed, desired upsample rate. In this manner, the reception digital upsampling circuits 710R(1)-710R(N) in the reception programmable digital signal processing circuits 708R(1)-708R(N) can be configured and reconfigured to upsample at any desired upsampling rate to provide for expansion and reconfiguration of supported communications services. The user interface 353 may be provided in the HEU 302 that allows a user or other system to direct the controller circuit 352 to program the reception upsample rate in memory 328 for use by reception digital upsampling circuits 710R(1)-710R(N) in upsampling reception downsampled digital RF communications signals 704R(1)-704R(N).

With continuing reference to FIG. 5A, the reception programmable digital signal processing circuits 708R(1)-708R(N) also include a respective reception digital filter circuit 722R(1)-722R(N). The reception digital filter circuits 722R(1)-722R(N) are each configured to digitally filter the reception upsampled digital RF communications signals 712R(1)-712R(N) in a programmed reception passband into reception filtered upsampled digital RF communications signals 724R(1)-724R(N). The controller circuit 352 is configured to read the programmed reception passband in a reception passband entry 726 from the memory 328 and configure the reception digital filter circuits 722R(1)-722R(N) to digitally filter the reception upsampled digital RF communications signals 712R(1)-712R(N) in the programmed, desired passband. In this manner, the reception digital filter circuits 722R(1)-722R(N) in the reception programmable digital signal processing circuits 708R(1)-708R(N) can be configured and reconfigured to upsample at any desired filtering passband to provide for expansion and reconfiguration of supported communications services. The user interface 353 in the HEU 302 can be configured to allow a user or other system to direct the controller circuit 352 to program the desired reception passband rate in memory 328 for use by the reception digital filter circuits 722R(1)-722R(N) in digitally filtering the reception upsampled digital RF communications signals 712R(1)-712R(N).

With continuing reference to FIG. 5A, reception programmable digital signal processing circuits 708R(1)-708R(N) also include optional reception DUC circuits 728R(1)-728R(N) configured to upconvert from baseband frequency, the frequency of the reception filtered upsampled digital RF communications signals 724R(1)-724R(N) into reception digital RF communications signals 730R(1)-730R(N). The frequency upconversion may be to the original frequency of the transmission digital RF communications signals 620T(1)-620T(R) in the RAU 304(1) (see FIG. 5B). Reception DAC circuits 732R(1)-732R(N) are provided that are each configured to convert the reception digital RF communications signals 730R(1)-730R(N) into the reception analog RF communications signals 742R(1)-742R(N) representing an analog form of the reception digital RF communications signals 730R(1)-730R(N). The reception analog RF communications signals 742R(1)-742R(N) are directed to a reception analog output communications interface 734R that includes reception analog front end processing circuits 736R(1)-736R(N). The reception analog front end processing circuits 736R(1)-736R(N) may be configured to further process the reception analog RF communications signals 742R(1)-742R(N) to generate the reception analog RF communications signals 340R(1)-340R(N) to be distributed to the analog RF signal sources 308(1)-308(R).

Figures 7, 8:
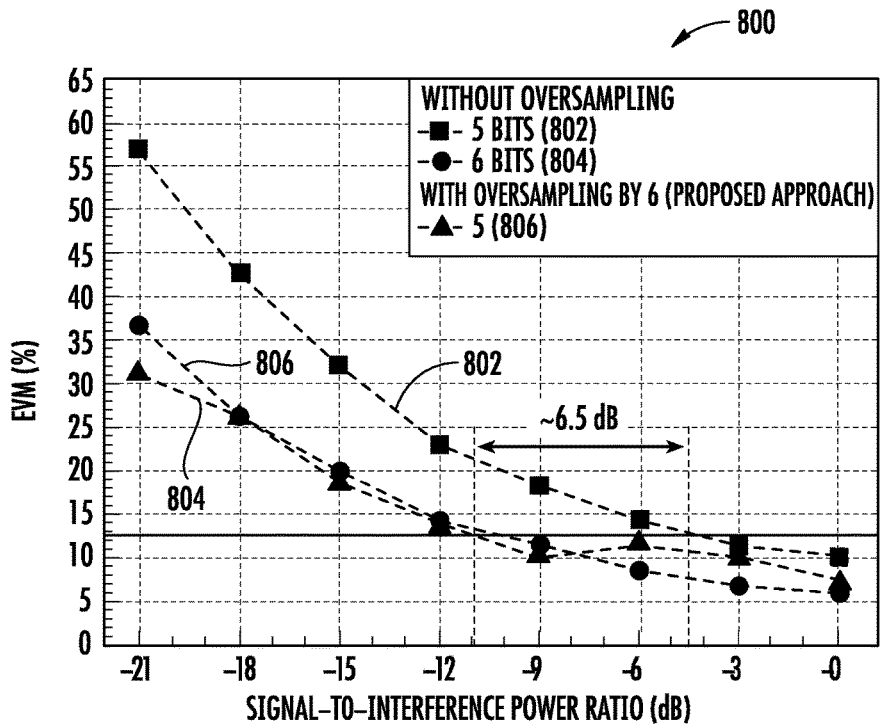
FIG. 7 is a chart illustrating an exemplary performance of a 5-bit resolution wideband digital DCS that reduces interference by configuring an analog-to-digital conversion (ADC) circuit to a 6-times oversample rate combined with digital filtering and decimation to restore dynamic range with a reduced bit transmission rate.
FIG. 8 is a table illustrating an exemplary comparison of signal-to-interference (SIR) power ratio, A/D sampling rate, and bit transmission rate between a 6-bit resolution wideband digital DCS, and a 5-bit resolution wideband digital DCS with ADC circuit configured to a 6-times oversample rate combined with digital filtering and decimation to restore dynamic range with a reduced bit transmission rate.

FIG. 7 is a chart 800 illustrating an exemplary performance of a 5-bit resolution wideband digital DCS that reduces interference by configuring an ADC circuit to a 6-times oversample rate combined with digital filtering and decimation to restore dynamic range with a reduced bit transmission rate. The ADC circuit could be the transmission ADC circuit 318(1)-318(R) in the HEU 302 in FIG. 5A and/or the transmission ADC circuits 618(1)-618(N) in the RAUs 304(1)-304(N), as shown in transmission ADC circuit 618(1) in the RAU 304(1) in FIG. 5B. The efficiency of the proposed embodiments to improve the performance of a WDS in the presence of interference, and without requiring the use of costly high bit resolution ADC circuits is shown. The graph 800 shows that the performance curve 802 of the 5-bit resolution system (with interference) can be improved (i.e. EVM increased) by increasing the number of bits of the ADC circuit from 5 bits to 6 bits, as shown in curve 806. The results further confirm that configuring the ADC circuit to oversample by a factor of six (6) in combination with digital filtering and downsampling (i.e., decimation) by a factor of six (6) restores the performance of the 5-bit system to the same level of performance as the 6-bit system, as shown in curve 804.

FIG. 8 is a table 808 illustrating an exemplary comparison of SIR power ratio, A/D sampling rate, and bit transmission rate between a 6-bit resolution wideband digital DCS, and a 5-bit resolution wideband digital DCS with ADC circuit configured to a 6-times oversample rate combined with digital filtering and decimation to restore dynamic range with a reduced bit transmission rate. The sampling frequency of the conventional WDS was 650 MHz. The sampling frequency of proposed WDS was 3.9 GHz. Assuming the lowest allowed SIR of a WDS afflicted by a strong interference signal of −4.5 dB, this means that any increase in the level of the interfering signal would cause the performance of the WDS to fall below the required threshold. With an ADC circuit bit resolution of five (5) bits, the physical bit rate transmission of the front-haul of this WDS was 3.25 Gb/s. One way to increase the tolerance of the system to stronger interference would be to use an ADC circuit with a higher number of bits. In this case, using a 6-bit ADC circuit results in a higher tolerance to interference (6.5 dB more), thus allowing the WDS to meet the required performance level even with a lower SIR of −11 dB. However, using a 6-bit-resolution ADC circuit results in a higher physical bit rate transmission of the front-haul to 3.9 Gb/s (20% increase). To the contrary, using the proposed embodiments, it is possible to restore the minimum SIR to −11 dB without increasing the physical bit transmission rate. In this system, the carrier frequency used was 2.4 GHz, the desired and interfering signals were OFDM signals with 135 MHz bandwidth.

Figures 2, 9A:
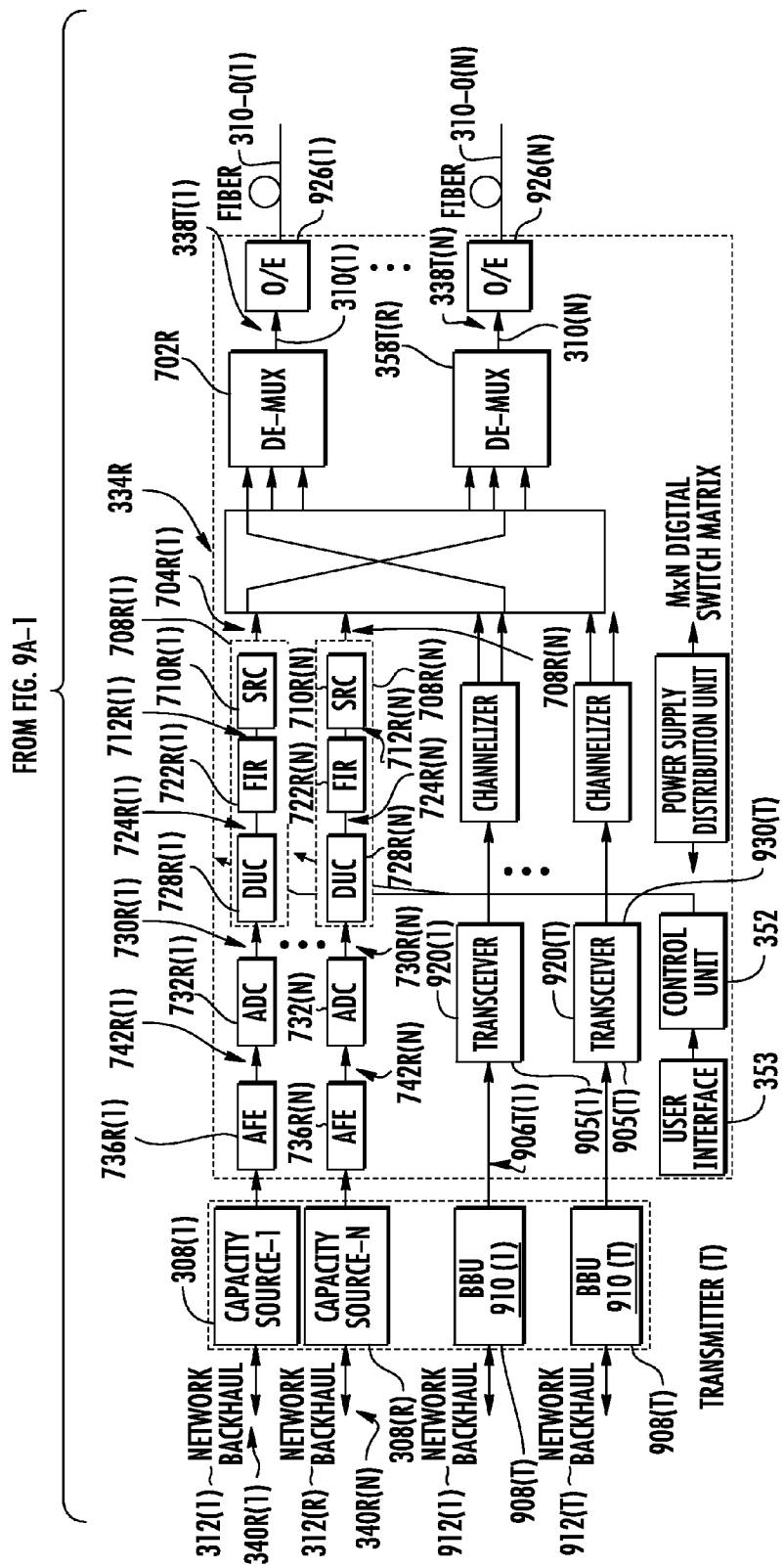
FIGS. 9A and 9B are schematic diagrams of another exemplary wideband digital DCS employing a head-end unit and remote units with programmable digital processing signal circuit for scaling supported communications services and digital baseband communications services.
Figure 9B:
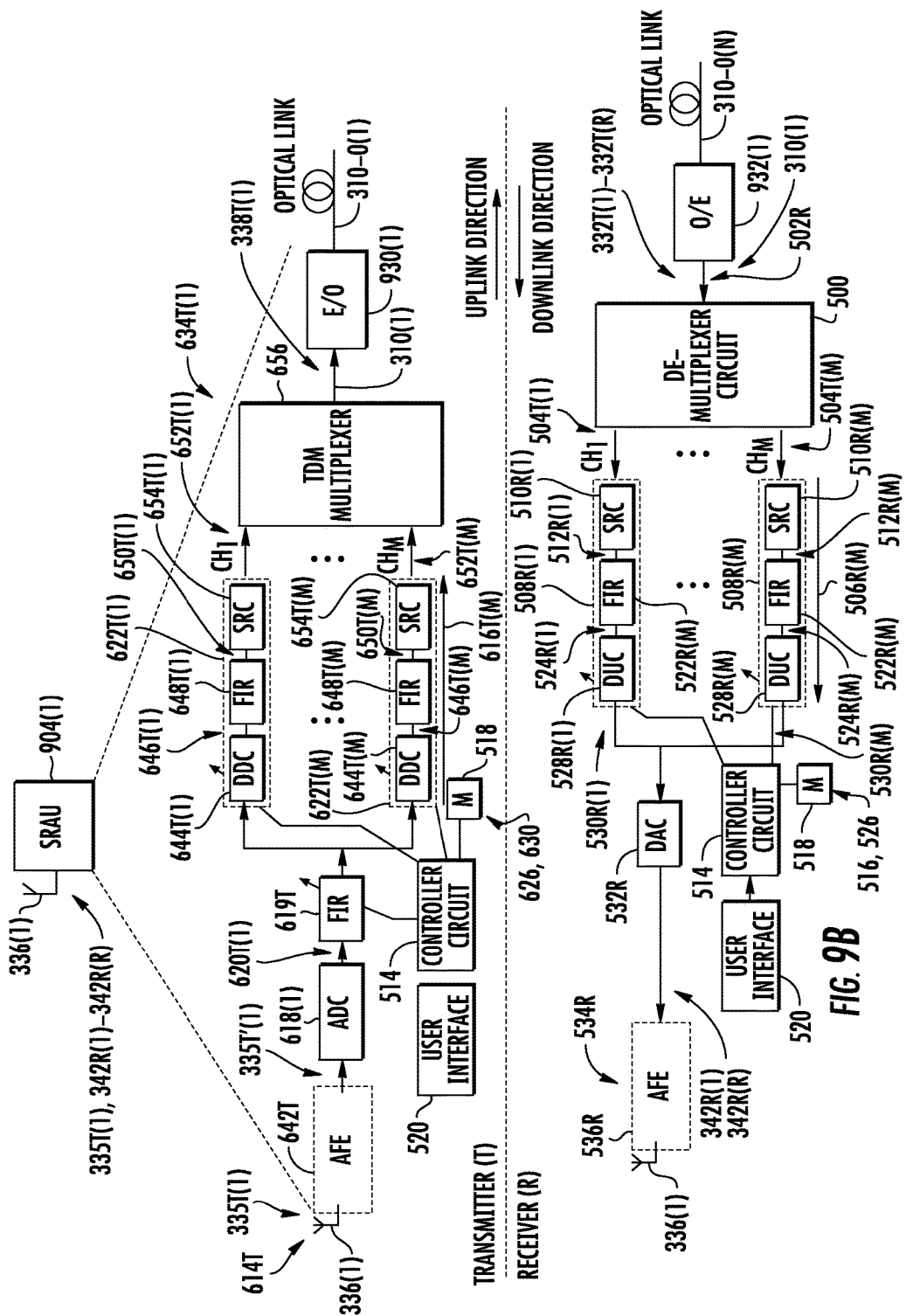

A WDS employing programmable digital signal processing circuits for scaling supported communications services, including but not limited to the DCSs in FIGS. 3, 5A-5B, and 9A-9B, can also include a digital signal source for distributing communications signals received already in a digitized format. Further, such WDSes can also include optical fiber communication links to provide greater data bit rate transmission capacity. In this regard, FIGS. 9A and 9B are a schematic diagram of another exemplary HEU 902 and RAU 904 (only RAU 904(1) is shown) employing a programmable digital processing signal circuit for scaling supported communications services and digital baseband communications services. The HEU 902 and RAU 904 are similar to the HEU 302 and RAU 304(1) in FIGS. 5A and 5B, and thus common components therebetween are shown with common element numbers and thus will not be re-described. As shown in FIG. 9A, the HEU 902 includes transmission digital input communications interfaces 905(1)-905(T) coupled to transmission digital communications paths 916(1)-916(T). The transmission digital input communications interfaces 905(1)-905(T) are configured to receive, from digital RF signal source 908(1)-908(T), transmission digital RF communications signals 906T(1)-906T(T). The digital RF signal sources 908(1)-908(T) may be baseband units (BBUs) 910(1)-910(T) as an example. The digital RF signal sources 908(1)-908(T) may be coupled to network backhauls 912(1)-912(T). The transmission digital communications paths 916(1)-916(T) include respective transceivers 920(1)-920(T) and channelizer circuits 922(1)-922(T) to distribute the transmission digital RF communications signals 906T(1)-906T(T) to the RAUs 904(1)-904(N), of which a generalized diagram of RAU 904 is shown in FIG. 9B. Electrical-to-optical (E-O) converters 924(1)-924(N) are provided to convert the transmission digital RF communications signals 906T(1)-906T(T) and the transmission downsampled digital RF communications signals 332T(1)-332T(R) to optical digital RF communications signals to be distributed over optical communications links 310-0(1)-310-0(N). The receiver (R) side of the HEU 902 includes optical-to-electrical (O-E) converters 926(1)-926(N) that are configured to convert received downsampled digital RF communications signals 338T(1)-338T(N) from the RAUs 904(1)-904(N) as optical digital RF communications signals from the RAUs 904(1)-904(N) to electrical signals. The received optical digital RF communications signals are the same as the digital RF communications signals described above with regard to FIG. 9A, but in optical form.

To support distribution of optical digital RF communications signals, the RAU 904(1) shown in FIG. 9B shows an E-O converter 930(1) configured to convert downsampled digital RF communications signal 338T(1) into optical digital RF communications signals. Further, the RAU 904(1) shown in FIG. 9B shows an O-E converter 932(1) configured to convert transmission downsampled digital RF communications signals 332T(1)-332T(R) into optical digital RF communications signals. The RAU 904(1) illustrated in FIG. 9B is applicable to the other RAUs 904(2)-904(N) not shown.

Figure 10:
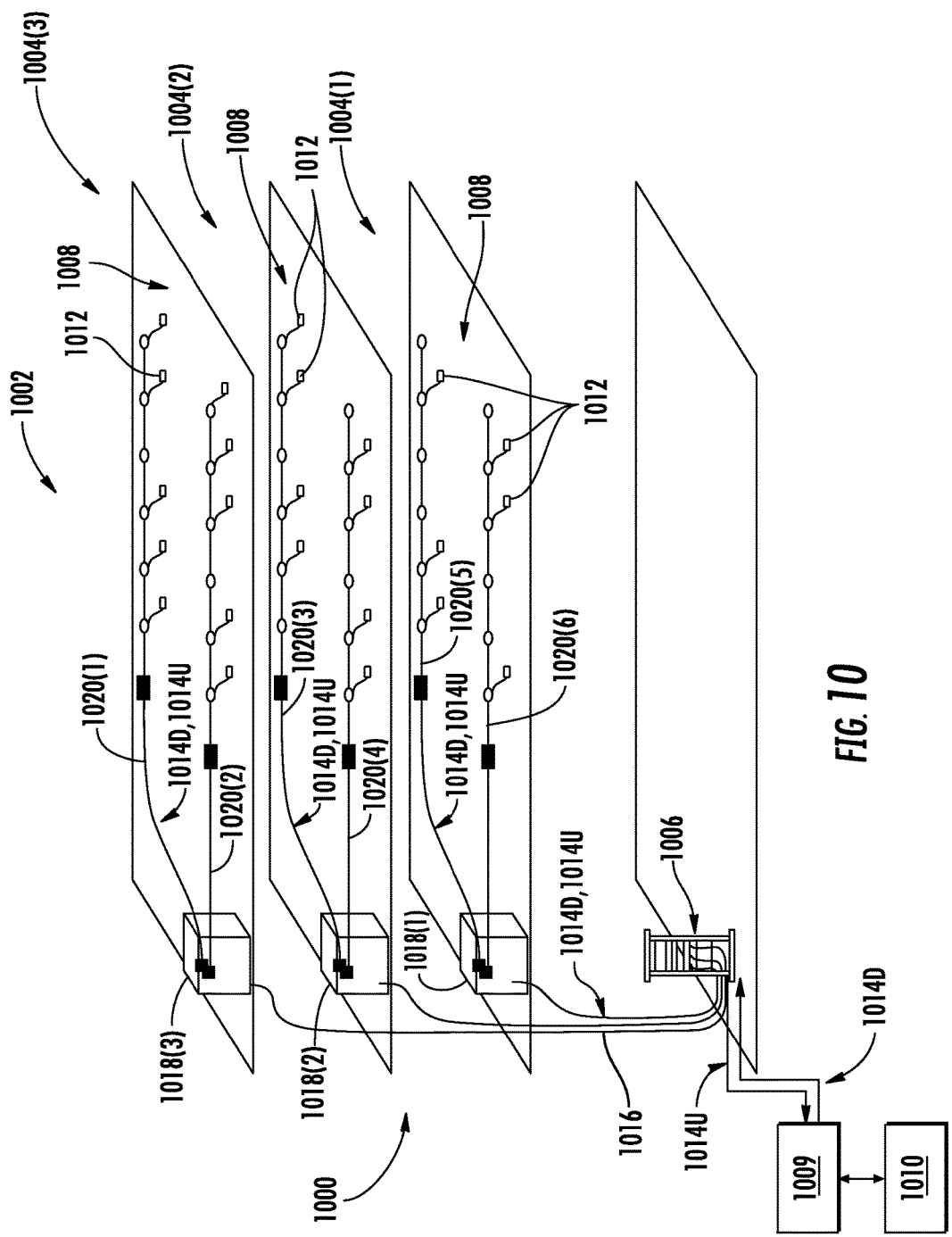
FIG. 10 is a partially schematic cut-away diagram of an exemplary building infrastructure in which a DCS, including but not limited to the DCSs in FIGS. 3, 5A-5B and 9A-9B can be provided, wherein unlicensed communications signal paths in the remote units are configured to be disabled or disconnected to disable distribution of unlicensed communications signals based on monitored communications signal activity in unlicensed spectrum on the unlicensed communications signal path(s) in the remote units.

A wideband digital DCS employing programmable digital signal processing circuits for scaling supported communications services, including but not limited to the DCSs in FIGS. 3, 5A-5B and 9A-9B, can be provided in an indoor environment, such as illustrated in FIG. 10. In this regard, FIG. 10 is a partially schematic cut-away diagram of a building infrastructure 1000 employing a WDS 1002 employing a programmable digital signal processing circuit for scaling supported communications services. The building infrastructure 1000 in this embodiment includes a first (ground) floor 1004(1), a second floor 1004(2), and a third floor 1004(3). The floors 1004(1)-1004(3) are serviced by the central unit 1006 to provide the antenna coverage areas 1008 in the building infrastructure 1000. The central unit 1006 is communicatively coupled to a base station 1009 to receive downlink communications signals 1014D from the base station 1009. The base station 1009 may be coupled to an operational and support system (OSS) 110 to receive data about the performance of remote antenna units 1012 in the WDS 1002 on a per remote unit basis for determining WDS optimizations. The central unit 1006 is communicatively coupled to the remote antenna units 1012 to receive uplink communications signals 1014U from the remote antenna units 1012, similar to as previously discussed above for other WDSs. The downlink and uplink communications signals 1014D, 1014U communicated between the central unit 1006 and the remote antenna units 1012 are carried over a riser cable 1016 in this example. The riser cable 1016 may be routed through interconnect units (ICUs) 1018(1)-1018 (3) dedicated to each floor 1004(1)-1004(3) that route the downlink and uplink communications signals 1014D, 1014U to the remote antenna units 1012 and also provide power to the remote antenna units 1012 via array cables 1020(1)-1020(6).

The supported communications services in the WDSes disclosed herein can include any communications bands desired. Examples of communication services include, but are not limited to, the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The communications bands may include licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink). Further, the WDS can be configured to support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CPDP).

Figure 11:
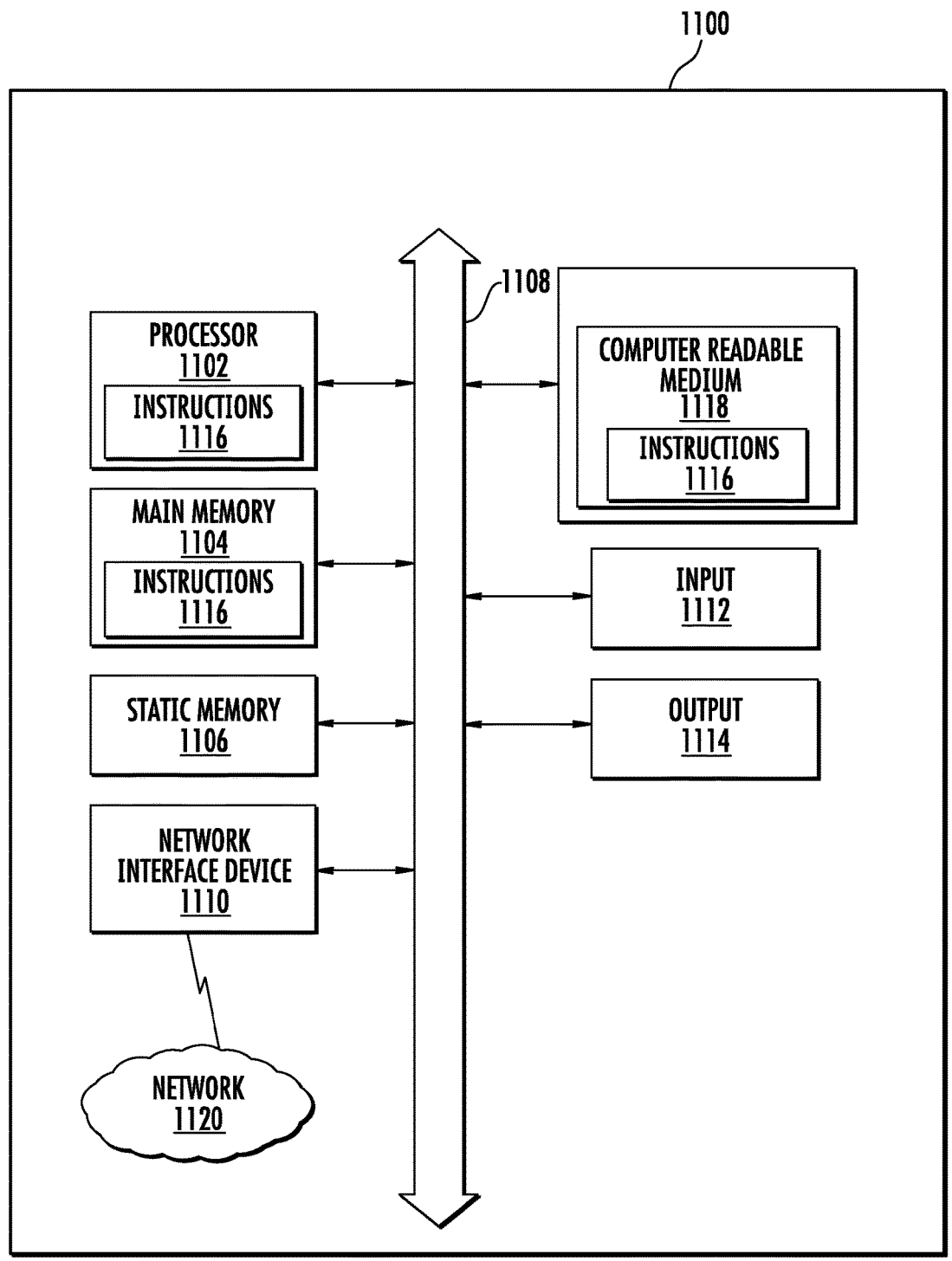
FIG. 11 is a schematic diagram of a generalized representation of an exemplary controller that can be included in any head-end unit or remote unit in a DCS, wherein the controller is configured to reprogram the digital processing signal circuit in a head-end unit and/or a remote unit to reconfigure the central and/or the remote unit for scaling supported communications services, wherein the exemplary computer system is adapted to execute instructions from an exemplary computer readable link.

FIG. 11 is a schematic diagram representation of additional detail illustrating a computer system 1100 that could be employed in a controller circuit for configuring processing circuits in a WDS employing programmable digital signal processing circuits for scaling supported communications services, including but not limited to the DCS. For example, the computer system 1100 could provide the controller circuits 352, 514 in the HEU 302 and RAU 304(1) in FIGS. 5A and 5B as an example. In this regard, the computer system 1100 is adapted to execute instructions from an exemplary computer-readable medium to perform these and/or any of the functions or processing described herein.

In this regard, the computer system 1100 in FIG. 11 may include a set of instructions that may be executed to program and configure programmable digital signal processing circuits in a WDS for supporting scaling of supported communications services. The computer system 1100 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1100 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1100 in this embodiment includes a processing device or processor 1102, a main memory 1104 (e.g., read-only memory (ROM), flash memory, dynamic random access memory (DRAM), such as synchronous DRAM (SDRAM), etc.), and a static memory 1106 (e.g., flash memory, static random access memory (SRAM), etc.), which may communicate with each other via a data bus 1108. Alternatively, the processor 1102 may be connected to the main memory 1104 and/or static memory 1106 directly or via some other connectivity means. The processor 1102 may be a controller, and the main memory 1104 or static memory 1106 may be any type of memory.

The processor 1102 represents one or more general-purpose processing devices, such as a microprocessor, central processing unit, or the like. More particularly, the processor 1102 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1102 is configured to execute processing logic in instructions for performing the operations and steps discussed herein.

The computer system 1100 may further include a network interface device 1110. The computer system 1100 also may or may not include an input 1112, configured to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processor 1102 during execution thereof by the computer system 1100, the main memory 1104 and the processor 1102 also constituting computer-readable medium. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

Note that any of the components disclosed herein can be applied to both downlink and/or uplink communication paths in the WDSs disclosed herein. For example, the transmitter (T) side of the HEU 302 in the upper portion of FIG. 5A is in the downlink direction and thus the components therein can be for downlink components and be referenced as such. As another example, the receiver (R) side of the HEU 302 in the lower portion of FIG. 5A is in the uplink direction and thus the components therein can be uplink components as be referenced as such. As another example, the transmitter (T) side of the RAU 304(1) in the upper portion of FIG. 5B is in the uplink direction and thus the components therein can be for uplink components and be referenced as such. As another example, the receiver (R) side of the RAU 304(1) in lower portion of FIG. 5B is in the downlink direction and thus the components therein can be downlink components as be referenced as such.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A signal distribution unit in a wideband digital wireless distribution system (WDS), comprising:
    a transmission analog input communications interface coupled to a transmission communications path, the transmission analog input communications interface configured to receive, from an analog radio frequency (RF) signal source, a transmission analog RF communications signal having a communications bandwidth for a communications service;
    the transmission communications path configured to receive the transmission analog RF communications signal from the transmission analog input communications interface, the transmission communications path comprising:
        a transmission analog-to-digital conversion (ADC) circuit configured to oversample a received transmission analog RF communications signal at a programmed transmission oversampling rate of at least twice the highest frequency in the communications bandwidth to generate a transmission digital RF communications signal representing a digitized form of the transmission analog RF communications signal; and
        a transmission programmable digital signal processing circuit, comprising:
            a transmission digital filter circuit configured to digitally filter the transmission digital RF communication signals in a programmed transmission passband into a transmission filtered digital RF communications signal;
            a transmission digital downsampling circuit configured to downsample the transmission filtered digital RF communications signals at a programmed transmission downsample rate based on the programmed transmission oversampling rate to generate a transmission downsampled digital RF communications signal;
    a transmission digital output communications interface coupled to the transmission communications path and at least one transmission communications link coupled to at least one signal receiver unit in the WDS, the transmission digital output communications interface configured to distribute the transmission downsampled digital RF communications signal over the at least one transmission communications link to the at least one signal receiver unit;
    a reception digital input communications interface coupled to a reception digital communications path, the reception digital input communications interface configured to receive, from at least one reception communications link, the transmission downsampled digital RF communications signal;
    the reception digital communications path configured to receive a reception digital RF communications signal from the reception digital input communications interface, the reception digital communications path comprising:
        a reception programmable digital signal processing circuit, comprising:
            a reception digital upsampling circuit configured to upsample the received transmission downsampled digital RF communications signal at a programmed reception upsample rate based on the programmed transmission downsample rate to generate a reception upsampled digital RF communications signal; and
            a reception digital filter circuit configured to digitally filter the reception upsampled digital RF communications signals in a programmed reception passband into a reception filtered upsampled digital RF communications signal; and
        a reception digital-to-analog conversion (DAC) circuit configured to convert the reception filtered upsampled digital RF communications signal into a reception analog RF communications signal representing an analog form of the reception filtered upsampled digital RF communications signal; and
    a reception analog output communications interface coupled to the reception digital communications path, the reception analog output communications interface configured to distribute the reception analog RF communications signal.

2. The signal distribution unit of claim 1, wherein no filtering circuit is provided in the transmission communications path between the transmission analog input communications interface and the transmission ADC circuit.

3. The signal distribution unit of claim 1, wherein the transmission communications path further comprises a transmission analog front end processing circuit communicatively coupled between the transmission analog input communications interface and the transmission ADC circuit, the transmission analog front end processing circuit comprising a front end filtering circuit configured to filter the received transmission analog RF communications signal into a transmission filtered analog RF communications signal;

wherein:
the transmission communications path is configured to receive the transmission filtered analog RF communications signal; and
the transmission ADC circuit is configured to oversample the received transmission filtered analog RF communications signal at the programmed transmission oversampling rate of at least twice the highest frequency in the communications bandwidth to generate the transmission digital RF communications signal representing the digitized form of the transmission filtered analog RF communications signal.

4. The signal distribution unit of claim 1, wherein:
the transmission programmable digital signal processing circuit further comprises a transmission digital downlink conversion (DDC) circuit configured to downconvert the frequency of the transmission digital RF communications signal into a transmission baseband digital RF communications signal; and
the transmission digital filter circuit is configured to digitally filter the transmission baseband digital RF communications signals in the programmed transmission passband into transmission filtered baseband digital RF communications signal.

5. The signal distribution unit of claim 1, wherein the transmission programmable digital signal processing circuit further comprises a memory comprising a programmed transmission downsample rate entry; and
further comprising a controller circuit configured to store the programmed transmission downsample rate in the programmed transmission downsample rate entry in the memory;
the transmission digital downsampling circuit configured to downsample the transmission filtered digital RF communications signals at the programmed transmission downsample rate stored in the programmed transmission downsample rate entry to generate the transmission downsampled digital RF communications signal.

6. The signal distribution unit of claim 5, wherein:
the memory further comprises a transmission passband entry;
the controller circuit is further configured to store the programmed transmission passband in the transmission passband entry in a memory; and
the transmission digital filter circuit configured to digitally filter the transmission digital RF communications signals in the programmed transmission passband stored in the transmission passband entry into the transmission filtered digital RF communications signal.

7. The signal distribution unit of claim 1, wherein the transmission communications path further comprises a programmable digital filtering circuit communicatively coupled between the transmission analog input communications interface and the transmission ADC circuit, the programmable interference filter configured to filter out interference signals outside of the programmed transmission passband.

8. The signal distribution unit of claim 1, wherein:
the at least one transmission communications link is comprised of a plurality of transmission communications links; and
further comprising a plurality of the transmission communication paths coupled to a respective transmission communications link among the plurality of transmission communications links.

9. The signal distribution unit of claim 8, further comprising a switch matrix circuit configured to:

receive a plurality of transmission downsampled digital RF communications signals from the plurality of the transmission communication paths; and
selectively route the plurality of transmission downsampled digital RF communications signals to at least one transmission communications link among the plurality of transmission communications links.

10. The signal distribution unit of claim 1, further comprising:
a transmission digital input communications interface coupled to a transmission digital communications path, the transmission digital input communications interface configured to receive, from a digital RF signal source, a transmission digital RF communications signal; and
a second transmission digital output communications interface coupled to the transmission communications path and the at least one transmission communications link coupled to the at least one signal receiver unit in the WDS, the second transmission digital output communications interface configured to distribute the transmission digital RF communications signal over the transmission communications link to the at least one signal receiver unit.

11. The signal distribution unit of claim 10, wherein:
the at least one transmission communications link is comprised of a plurality of transmission communications links; and
further comprising a switch matrix circuit configured to:
receive the transmission downsampled digital RF communications signal from the transmission communications path;
receive the transmission digital RF communications signal from the transmission digital communication path; and
selectively route the transmission downsampled digital RF communications signal and the transmission digital RF communications signal to at least one transmission communications link among the plurality of transmission communications links.

12. The signal distribution unit of claim 1, wherein no filtering circuit is provided in the reception digital communications path between the reception analog output communications interface and the reception programmable digital signal processing circuit.

13. The signal distribution unit of claim 1, wherein:
the reception programmable digital signal processing circuit further comprises a reception digital uplink conversion (DUC) circuit configured to upconvert the frequency of the reception filtered upsampled digital RF communications signal into a reception digital RF communications signal; and
the reception DAC circuit configured to convert the reception digital RF communications signal into the reception analog RF communications signal representing an analog form of the reception digital RF communications signal.

14. The signal distribution unit of claim 1, wherein the reception programmable digital signal processing circuit further comprises a memory comprising a programmed reception upsample rate entry; and
further comprising a controller circuit configured to store the programmed reception upsample rate in the programmed reception upsample rate entry in the memory;
the reception digital upsampling circuit configured to upsample the received reception digital RF communications signals at the programmed reception upsample rate stored in the programmed reception upsample rate entry to generate the reception upsampled digital RF communications signal.

15. The signal distribution unit of claim 14, wherein:
the memory further comprises a reception passband entry;
the controller circuit is further configured to store the programmed reception passband in the reception passband entry in the memory; and
the reception digital filter circuit configured to digitally filter the reception upsampled digital RF communications signals in the programmed reception passband stored in the reception passband entry in the memory into the reception filtered upsampled digital RF communications signal.

16. The signal distribution unit of claim 1, wherein:
the at least one reception communications link is comprised of a plurality of reception communications links; and
further comprising a plurality of the reception digital communications paths coupled to a respective reception communications link among the plurality of reception communications links.

17. The signal distribution unit of claim 16, further comprising a switch matrix circuit configured to:
receive a plurality of reception digital RF communications signals from the plurality of the reception digital communications paths; and
selectively route the plurality of reception digital RF communications signals to reception programmable digital signal processing circuits.

18. The signal distribution unit of claim 1, further comprising a reception digital output communications interface coupled to the reception digital communications path and the at least one reception communications link coupled to a transmission signal unit in the WDS, the reception digital output communications interface configured to distribute the reception digital RF communications signal.

19. The signal distribution unit of claim 18, further comprising a switch matrix circuit configured to:
receive a plurality of reception digital RF communications signals from the plurality of the reception digital communications paths; and
selectively route the reception digital RF communications signals between the reception digital output communications interface and the reception programmable digital signal processing circuit.

20. The signal distribution unit of claim 1 comprising a head-end unit, wherein:
the transmission communications path comprises a downlink transmission communications path;
the transmission analog RF communications signal comprises a downlink analog RF communications signal received from a network; and
the at least one signal receiver unit is comprised of at least one remote antenna unit.

21. The signal distribution unit of claim 1 comprising a head-end unit, wherein:
the reception digital communications path comprises an uplink digital communications path; and
the reception digital RF communications signal comprises an uplink digital RF communications signal received from at least one remote antenna unit.

22. The signal distribution unit of claim 1 comprising a remote antenna unit, wherein:
the transmission communications path comprises an uplink transmission communications path;
the transmission analog RF communications signal comprises an uplink analog RF communications signal received from a client device; and
the at least one signal receiver unit is comprised of a head-end unit.

23. The signal distribution unit of claim 1 comprising a remote antenna unit, wherein:
the reception digital communications path comprises a downlink digital communications path; and
the reception digital RF communications signal comprises a downlink digital RF communications signal received from the head-end unit.

24. A signal distribution unit in a wideband digital wireless distribution system (WDS), comprising:
a transmission analog input communications interface coupled to a transmission communications path, the transmission analog input communications interface configured to receive, from an analog radio frequency (RF) signal source, a transmission analog RF communications signal having a communications bandwidth for a communications service;
the transmission communications path configured to receive the transmission analog RF communications signal from the transmission analog input communications interface, the transmission communications path comprising:
a transmission analog-to-digital conversion (ADC) circuit configured to oversample a received transmission analog RF communications signal at a programmed transmission oversampling rate of at least twice the highest frequency in the communications bandwidth to generate a transmission digital RF communications signal representing a digitized form of the transmission analog RF communications signal; and
a transmission programmable digital signal processing circuit, comprising:
a transmission digital filter circuit configured to digitally filter the transmission digital RF communication signals in a programmed transmission passband into a transmission filtered digital RF communications signal;
a transmission digital downsampling circuit configured to downsample the transmission filtered digital RF communications signals at a programmed transmission downsample rate based on the programmed transmission oversampling rate to generate a transmission downsampled digital RF communications signal; and
a transmission digital output communications interface coupled to the transmission communications path and at least one transmission communications link coupled to at least one signal receiver unit in the WDS, the transmission digital output communications interface configured to distribute the transmission downsampled digital RF communications signal over the at least one transmission communications link to the at least one signal receiver unit, wherein:
the transmission analog input communications interface is configured to receive, from the analog RF signal source, an electrical transmission analog RF communications signal having the communications bandwidth for the communications service;
the transmission communications path is configured to receive the electrical transmission analog RF communications signal from the transmission analog input communications interface;

the transmission ADC circuit is configured to oversample the received electrical transmission analog RF communications signal at the programmed transmission oversampling rate of at least twice the highest frequency in the communications bandwidth to generate an electrical transmission digital RF communications signal representing the digitized form of the electrical transmission analog RF communications signal; and the transmission digital filter circuit is configured to digitally filter the electrical transmission digital RF communication signals in the programmed transmission passband into an electrical transmission filtered digital RF communications signal; and the transmission digital downsampling circuit is configured to downsample the electrical transmission filtered digital RF communications signals at the programmed transmission downsample rate based on the programmed transmission oversampling rate to generate an electrical transmission downsampled digital RF communications signal;

the transmission communications path further comprises an electrical-to-optical (E-O) converter configured to convert the electrical transmission downsampled digital RF communications signal into an optical transmission downsampled digital RF communications signal;

the transmission digital output communications interface coupled to the transmission communications path and at least one optical transmission communications link coupled to at least one signal receiver unit in the WDS, the transmission digital output communications interface configured to distribute the optical transmission downsampled digital RF communications signal over the at least one optical transmission communications link to the at least one signal receiver unit.

25. A signal distribution unit in a wideband digital wireless distribution system (WDS), comprising:

a transmission analog input communications interface coupled to a transmission communications path, the transmission analog input communications interface configured to receive, from an analog radio frequency (RF) signal source, a transmission analog RF communications signal having a communications bandwidth for a communications service;

the transmission communications path configured to receive the transmission analog RF communications signal from the transmission analog input communications interface, the transmission communications path comprising:

a transmission analog-to-digital conversion (ADC) circuit configured to oversample a received transmission analog RF communications signal at a programmed transmission oversampling rate of at least twice the highest frequency in the communications bandwidth to generate a transmission digital RF communications signal representing a digitized form of the transmission analog RF communications signal; and a transmission programmable digital signal processing circuit, comprising:

a transmission digital filter circuit configured to digitally filter the transmission digital RF communication signals in a programmed transmission passband into a transmission filtered digital RF communications signal;

a transmission digital downsampling circuit configured to downsample the transmission filtered digital RF communications signals at a programmed transmission downsample rate based on the programmed transmission oversampling rate to generate a transmission downsampled digital RF communications signal; and a transmission digital output communications interface coupled to the transmission communications path and at least one transmission communications link coupled to at least one signal receiver unit in the WDS, the transmission digital output communications interface configured to distribute the transmission downsampled digital RF communications signal over the at least one transmission communications link to the at least one signal receiver unit, wherein:

the reception digital input communications interface is configured to receive, from the at least one reception communications link comprising at least one optical reception communications link, the optical transmission downsampled digital RF communications signal;

the reception digital communications path further comprises an optical-to-electrical (O-E) converter configured to convert the optical transmission downsampled digital RF communications signal into an electrical reception digital RF communications signal;

the reception digital communications path is configured to receive the electrical reception digital RF communications signal from the O-E converter;

the reception digital upsampling circuit is configured to upsample the received electrical reception digital RF communications signals at the programmed reception upsample rate based on the programmed transmission downsample rate to generate an electrical reception upsampled digital RF communications signal;

the reception digital filter circuit is configured to digitally filter the electrical reception upsampled digital RF communications signals in the programmed reception passband into an electrical reception filtered upsampled digital RF communications signal;

the reception DAC circuit is configured to convert the electrical reception filtered upsampled digital RF communications signal into an electrical reception analog RF communications signal representing an analog form of the electrical reception filtered upsampled digital RF communications signal; and the reception analog output communications interface coupled to the reception digital communications path, the reception analog output communications interface configured to distribute the electrical reception analog RF communications signal.

26. A method of distributing an analog radio-frequency (RF) communications signal in a wireless distribution system (WDS), comprising:

receiving from an analog RF signal source, a transmission analog RF communications signal having a communications bandwidth for a communications service on a transmission communications path;

oversampling the received transmission analog RF communications signal in the transmission communications path at a programmed transmission oversampling rate of at least twice the highest frequency in the communications bandwidth to generate a transmission digital RF communications signal representing a digitized form of the transmission analog RF communications signal;

digitally filtering the transmission digital RF communications signal in the transmission communications path in a programmed transmission passband into a transmission filtered digital RF communications signal;

downsampling the transmission filtered digital RF communications signals in the transmission communications path at a programmed transmission downsample rate based on the programmed transmission oversampling rate to generate a transmission downsampled digital RF communications signal;

distributing the transmission downsampled digital RF communications signal from the transmission communications path over at least one transmission communications link to at least one signal receiver unit;

receiving, from at least one reception communications link the transmission downsampled digital RF communications signal;

upsampling the received transmission downsampled digital RF communications signal at a programmed reception upsample rate based on the programmed transmission downsample rate to generate a reception upsampled digital RF communications signal;

digitally filtering the reception upsampled digital RF communication signals in a programmed reception passband into a reception filtered upsampled digital RF communications signal;

converting the reception filtered upsampled digital RF communications signal into a reception analog RF communications signal representing an analog form of the reception filtered upsampled digital RF communications signal; and distributing the reception analog RF communications signal.

27. The method of claim 26, further comprising not filtering the transmission communications path before oversampling the received transmission analog RF communications signal.

28. The method of claim 26, comprising filtering the received transmission analog RF communications signal into a transmission filtered analog RF communications signal before oversampling the received transmission analog RF communications signal, and comprising:

oversampling the received transmission filtered analog RF communications signal in the transmission communications path at the programmed transmission oversampling rate of at least twice the highest frequency in the communications bandwidth to generate the transmission digital RF communications signal representing the digitized form of the transmission analog RF communications signal.

29. The method of claim 28, further comprising amplifying the transmission filtered analog RF communications signal into a transmission amplified filtered analog RF communications signal, and comprising:

oversampling the received transmission amplified filtered analog RF communications signal in the transmission communications path at the programmed transmission oversampling rate of at least twice the highest frequency in the communications bandwidth to generate the transmission digital RF communications signal representing the digitized form of the transmission analog RF communications signal.

30. The method of claim 29, further comprising downconverting the frequency of the transmission digital RF communications signal into a transmission baseband digital RF communications signal, and comprising:

digitally filtering the transmission baseband digital RF communications signals in the programmed transmission passband into a transmission filtered baseband digital RF communications signal.

31. The method of claim 26, further comprising storing the programmed transmission downsample rate in a programmed transmission downsample rate entry in a memory, and comprising:

downsampling the transmission filtered digital RF communications signals at the programmed transmission downsample rate stored in the programmed transmission downsample rate entry to generate the transmission downsampled digital RF communications signal.

32. The method of claim 30, wherein:

further comprising storing the programmed transmission passband in a passband entry in a memory, and comprising:

digitally filtering the transmission digital RF communications signals in the programmed transmission passband stored in the programmed transmission downsample rate entry into the transmission filtered digital RF communications signal.

33. The method of claim 26, further comprising:

receiving, from a digital RF signal source, a transmission digital RF communications signal; and distributing the transmission digital RF communications signal over the at least one transmission communications link to the at least one signal receiver unit.

34. The signal distribution unit of claim 33, further comprising selectively routing the transmission downsampled digital RF communications signal and the transmission digital RF communications signal to the at least one transmission communications link.

35. The method of claim 26, further comprising not filtering a received reception digital RF communications signals before upsampling the received reception digital RF communications signals at the programmed reception upsample rate based on the programmed transmission downsample rate to generate the reception upsampled digital RF communications signal.

36. The method of claim 26, further comprising upconverting the frequency of the reception filtered upsampled digital RF communications signal into a reception digital RF communications signal, and comprising:

converting the reception digital RF communications signal into the reception analog RF communications signal representing an analog form of the reception digital RF communications signal.

37. The method of claim 26, further comprising storing the programmed reception upsample rate in a programmed reception upsample rate entry in a memory, and comprising:

upsampling received reception digital RF communications signals at the programmed reception upsample rate stored in the programmed reception upsample rate entry to generate the reception upsampled digital RF communications signal.

38. The method of claim 37, further comprising storing the programmed reception passband in a reception passband entry in a memory, and comprising:

digitally filtering the reception upsampled digital RF communications signals in the programmed reception passband stored in the reception passband entry in the memory into the reception filtered upsampled digital RF communications signal.

39. A wireless distribution system (WDS), comprising:

a head-end unit, comprising:

a head-end downlink analog input communications interface coupled to a head-end downlink communications path, the head-end downlink analog input communications interface configured to receive, from an analog radio frequency (RF) signal source, a downlink analog RF communications signal having a communications bandwidth for a communications service;
the head-end downlink communications path comprising:
a head-end downlink analog-to-digital conversion (ADC) circuit configured to oversample a received downlink analog RF communications signal at a programmed transmission oversampling rate of at least twice the highest frequency in the communications bandwidth to generate a downlink digital RF communications signal representing a digitized form of the downlink analog RF communications signal; and
a head-end transmission programmable digital signal processing circuit, comprising:
a head-end downlink digital filter circuit configured to digitally filter the downlink digital RF communications signals in a programmed transmission passband into a downlink filtered digital RF communications signal;
a head-end downlink digital downsampling circuit configured to downsample the downlink filtered digital RF communications signals at a programmed transmission downsample rate based on the programmed transmission oversampling rate to generate a downlink downsampled digital RF communications signal; and
a head-end downlink digital output communications interface coupled to the head-end downlink communications path and at least one transmission communications link coupled to at least one signal receiver unit in the WDS, the head-end downlink digital output communications interface configured to distribute the downlink downsampled digital RF communications signal over the at least one downlink communications link to at least one remote antenna unit among a plurality of remote antenna units; and
the at least one remote antenna unit among the plurality of remote antenna units comprises:
a remote downlink digital input communications interface coupled to a remote downlink digital communications path, the remote downlink digital input communications interface configured to receive, from the at least one downlink communications link, the downlink downsampled digital RF communications signal;
the remote downlink digital communications path comprising:
a remote downlink programmable digital signal processing circuit, comprising:
a remote downlink digital upsampling circuit configured to upsample the received downlink digital RF communications signals at a programmed reception upsample rate based on the programmed transmission downsample rate to generate a downlink upsampled digital RF communications signal; and
a remote downlink digital filter circuit configured to digitally filter the downlink upsampled digital RF communication signals in a programmed reception passband into a downlink filtered upsampled digital RF communications signal;
a remote downlink digital-to-analog conversion (DAC) circuit configured to convert the downlink filtered upsampled digital RF communications signal into the downlink analog RF communications signal representing an analog form of the downlink filtered upsampled digital RF communications signal; and
a remote downlink analog output communications interface configured to distribute the downlink analog RF communications signal to a client device.

40. The WDS of claim 39, wherein:
the at least one remote unit further comprises:
a remote uplink analog input communications interface configured to receive a downlink analog RF communications signal having a communications bandwidth for a communications service from a client device;
a remote uplink analog communications path comprising:
a remote uplink ADC circuit configured to oversample a received uplink analog RF communications signal at a programmed transmission oversampling rate of at least twice the highest frequency in the communications bandwidth to generate an uplink digital RF communications signal representing a digitized form of the uplink analog RF communications signal; and
a remote uplink transmission programmable digital signal processing circuit, comprising:
a remote uplink digital filter circuit configured to digitally filter the uplink digital RF communications signals in a programmed transmission passband into an uplink filtered digital RF communications signal;
a remote uplink digital downsampling circuit configured to downsample the uplink filtered digital RF communications signals at a programmed transmission downsample rate based on the programmed transmission oversampling rate to generate an uplink downsampled digital RF communications signal; and
a remote uplink digital output communications interface coupled to at least one uplink communications link, the remote uplink digital output communications interface configured to distribute the uplink downsampled digital RF communications signal over the at least one uplink communications link to the head-end unit; and
the head-end unit further comprises:
a head-end uplink digital input communications interface coupled to a head-end uplink digital communications path, the head-end uplink digital input communications interface configured to receive, from the at least one remote unit over the at least one uplink communications link, the uplink downsampled digital RF communications signal;
the head-end uplink digital communications path comprising:
a head-end uplink programmable digital signal processing circuit, comprising:
a head-end uplink digital upsampling circuit configured to upsample the received uplink downsampled digital RF communications signal at the programmed reception upsample rate based on the programmed transmission downsample rate to generate an uplink upsampled digital RF communications signal; and
a head-end uplink digital filter circuit configured to digitally filter the uplink upsampled digital RF communications signals in a programmed reception passband into an uplink filtered upsampled digital RF communications signal;

a head-end uplink digital-to-analog conversion (DAC) circuit configured to convert the uplink filtered upsampled digital RF communications signal into the uplink analog RF communications signal representing an analog form of the uplink filtered upsampled digital RF communications signal; and a head-end uplink analog output communications interface configured to distribute the uplink analog RF communications signal over the at least one uplink communications link to an analog RF signal source.

* * * * *